United States Patent [19]

Yonekura et al.

[11] Patent Number: 5,625,572

[45] Date of Patent: Apr. 29, 1997

[54] MULTIMEDIA PROCESS MONITOR AND CONTROL SYSTEM

[75] Inventors: Toshiaki Yonekura, Hino; Toshio Maenosono, Kawasaki; Shiro Nakatao, Hino; Masahiro Fujiwara, Kawasaki; Yuji Katada; Takashi Karasawa, both of Hino, all of Japan

[73] Assignees: Fuji Facom Corp., Tokyo; Fuji Electric Co. Ltd., Kawasaki, both of Japan

[21] Appl. No.: 681,064

[22] Filed: Jul. 22, 1996

Related U.S. Application Data

[63] Continuation of Ser. No. 286,552, Aug. 5, 1994, abandoned.

[30] Foreign Application Priority Data

Feb. 4, 1994 [JP] Japan ..................................... 6-032897

[51] Int. Cl.$^6$ ..................................... G05B 15/00
[52] U.S. Cl. ................. 364/514 A; 364/550; 364/551.01
[58] Field of Search ..................... 364/514 A, 552, 364/550, 551.02, 551.01; 348/86, 82, 92, 125

[56] References Cited

U.S. PATENT DOCUMENTS

| | | | |
|---|---|---|---|
| 4,555,561 | 11/1985 | Brown | 340/541 |
| 4,752,897 | 6/1988 | Zoeller et al. | 364/550 |
| 5,070,468 | 12/1991 | Niinomi et al. | 364/550 |
| 5,192,999 | 3/1993 | Graczyk et al. | 358/85 |
| 5,208,745 | 5/1993 | Quentin et al. | 364/188 |
| 5,210,526 | 5/1993 | Imperiali | 340/605 |
| 5,258,837 | 11/1993 | Gormley | 358/140 |
| 5,260,878 | 11/1993 | Luppy | 364/474.16 |
| 5,270,811 | 12/1993 | Ishibashi et al. | 358/108 |
| 5,278,643 | 1/1994 | Takemoto et al. | 358/108 |
| 5,284,164 | 2/1994 | Andrews et al. | 131/280 |
| 5,353,238 | 10/1994 | Neef et al. | 364/551.01 |
| 5,412,400 | 5/1995 | Takahara et al. | 345/119 |
| 5,416,725 | 5/1995 | Pacheco et al. | 364/514 |
| 5,539,869 | 7/1996 | Spoto et al. | 395/154 |

FOREIGN PATENT DOCUMENTS

| | | |
|---|---|---|
| 55-076406 | 8/1980 | Japan . |
| 56-116111 | 12/1981 | Japan . |
| 57-020812 | 5/1982 | Japan . |
| 62-245977 | 4/1988 | Japan . |
| 63-046517 | 7/1988 | Japan . |
| 01229593 | 12/1989 | Japan . |
| 03076490 | 6/1991 | Japan . |
| 05034181 | 6/1993 | Japan . |
| 06020180 | 4/1994 | Japan . |

OTHER PUBLICATIONS

WO-A-82 00065 (GP Elliott Electronic Systems: Elliott G(GB))–Jan. 7, 1982; p. 11, line 30; p. 12, lin 24; figures 2,3.
Database WPI—Week 7208—Derwent Publications Ltd., London, GB; AN 7212109T & NL-A-7 011 464 (Shell).
Tani, et al., "Direct Manipulation Technique for Plant Control Centers: Do It Through Cameras," T.IEE Japan vol. 111-D, 1991, No. 12.
Tani, "A Trend of Human Interface Technologies in Industrial Systems—Using Multimedia—," J.IEE Japan, vol. 113, May, 1993.

*Primary Examiner*—Emanuel T. Voeltz
*Assistant Examiner*—Patrick J. Assouad
*Attorney, Agent, or Firm*—Greer, Burns & Crain, Ltd.

[57] ABSTRACT

An image signal captured by a monitor camera is input to an image processing device, displayed on a multiwindow display, and stored in a main storage device. A sound signal collected by a mike is input to a sound processing device, regenerated through a speaker, and stored in the main storage device. Process data transmitted from a process data controller are displayed on the display and stored in the main storage device. If an abnormal condition is detected in a monitored object, often the data stored in the main storage device before or after the abnormal condition has occurred are saved into a auxiliary storage device. When data are regenerate, the saved data are synchronized with each other while being regenerated on the display and through the speaker.

17 Claims, 18 Drawing Sheets

MULTIMEDIA PROCESS MONITOR AND CONTROL SYSTEM

This application is a continuation of application Ser. No. 08/286,552 filed on Aug. 5, 1994 now abandoned.

BACKGROUND OF THE INVENTION

1. Field of the Invention

The present invention relates to a multimedia process monitor and control system for use in various industrial fields.

2. Description of the Related Art

There have been various multimedia process monitor systems. For example, they have been described in *A Plant Operation Monitoring Man-Machine Interface through a Direct Operation on Pictures* p. 1023–1030 by Tani, M. et al., T. IEE Japan, Vol. 111-D, No. 12, '91 and in Tokukai-hei 5-334438 *Object Position Mapping Method and Object Identifying Method using a Camera Image*, which is a patent application filed by the applicant. The plant monitor system shown in FIG. 1 is an example of the multimedia process monitor and control system.

As shown in FIG. 1, camera 1 and mike(microphone) 2 are installed to monitor with picture and sound the state of a plant site. A picture signal captured by camera 1 is transmitted to an image recording device 3. A sound signal collected by mike 2 is transmitted to a sound recording device 4. The image recording device 3 transmits an input picture signal directly to a multiplexer 5, records the picture signal, and regenerates it when necessary. The sound recording device 4 transmits an input sound signal directly to a speaker 12, regenerates and records it. A process data controller 6 controls input and output of process data of the plant.

A computer 8 comprises a CPU (central processing unit) 9, an auxiliary storage device 10, a console 11, a process data input/output unit 20, etc. It temporarily stores process data, which are input and output by the process data controller 6, in the auxiliary storage device 10 through the process data input/output unit 20, and transmits them to the multiplexer 5. The multiplexer 5 multiplexes the picture signal and the process data, and transmits them to a multiwindow display 7 to display them on it. Thus, an operator monitors the whole process through the display 7 and a speaker 12 while operating the console 11.

FIG. 2 shows an example of trend data in a form of a graph 13 on the display 7. FIG. 3 displays an image 14 captured by the camera 1 in addition to the trend data.

The operator monitors the display 7, detects abnormal conditions in the drawings of the plant system and process data on the display 7, and performs a recovery process on them.

However, the above described conventional management system has the following disadvantages;

(1) If an abnormal condition is detected and a recovery process is immediately performed on it, then the detailed analysis of the cause of the abnormal condition can hardly be made, thereby almost ignoring an detailed analysis of abnormal conditions. According to the conventional system, image data, sound data, and process data are independently recorded. Therefore, the data stored immediately before and after an abnormal condition can be easily regenerated independently, but it is very difficult to regenerate each type of data synchronously with another type of data.

(2) Since the system is designed in multimedia configuration, it requires a large-capacity storage device and a large-scale processing when image and sound data are stored in the system.

(3) Various types of data collected from a monitored object are related to one another, but are not effectively used to determine the existence of abnormal conditions.

(4) When the operator tries to detect an abnormal condition in input data, he or she should monitor the display all the time. If an abnormal condition occurs when the operator takes his or her eyes off the display, the abnormal condition may be overlooked and therefore incur delay in recovery.

(5) If an abnormal condition occurs when the operator is not at a monitor device, then an intruder in a monitored area cannot be informed of the abnormal condition.

(6) If the operator inputs voice data through a mike, he or she cannot input voice before performing an input operation.

(7) A number of sensors may be installed for a monitored object so that a state amount of the monitored object can be detected. In this case, the detected state amount is represented only by numbers on the screen. Therefore, it is not displayed effectively on a monitor screen.

SUMMARY OF THE INVENTION

The present invention has been developed to solve each of the above described problems, and aims to add various functions using multimedia and provides a high-performance multimedia process monitor and control system which can be easily operated.

According to the first principle of the present invention, the multimedia process monitor and control system for displaying on a display an image obtained by capturing a monitor object and process data input/output for the monitored object and for regenerating a sound collected from the monitored object comprises a unit for storing each type of data in a main storage cyclically in real time, a unit for saving in an auxiliary storage device each type of data stored in the main storage in a given period before and after an abnormal condition if it has been detected, and a unit for reading each type of data saved in the auxiliary storage device and regenerating them in synchronization through a display and a speaker.

An image obtained by capturing a monitored object, process data input/output in relation to the monitored object, and a sound collected from the monitored object are stored in the main storage device cyclically in real time. If an abnormal condition has been detected, then all data stored in the main storage device within a given period before and after the abnormal condition are temporarily saved in the auxiliary storage device. At the time of regenerating data, the saved data are read from the auxiliary storage unit, and regenerated in synchronization through the display and speaker.

The second principle of the present invention based on the first principle further comprises a unit for comparing input process data with the latest process data already input and stored in the main storage device, determining whether or not they match each other, and detecting a change in the state of the process data, and a unit for storing process data in the main storage device only when the change in the state of the process data has been detected.

Process data input as relating to a monitored object are compared with the latest process data already input and stored in the main storage device, and it is determined whether or not they match each other. The process data are stored in the main storage device only if a change in the state of the process data can be detected. Thus, the same process data are not stored in series in the main storage device.

The third principle of the present invention based on the first and second principles comprises a storing unit for storing reference data of a plurality of levels from a normal state to an abnormal state for each of image data, sound data, and process data, a unit for calculating the abnormality of input data from the similarity obtained by comparing input data with reference data, and a unit for comparing the abnormality of the input data with a predetermined threshold, determining whether the input data are normal or abnormal, and outputting an abnormality detection signal if they are determined to be abnormal.

Reference data of a plurality of levels from a normal state to an abnormal state are preliminarily stored for each of image data, sound data, and process data. The abnormality of input data is calculated from the similarity obtained by comparing the input data with the reference data. Then, the abnormality of the input data is compared with a predetermined threshold and it is determined whether or not the input data are normal or abnormal.

The fourth principle of the present invention based on the third principle comprises a storing unit for preliminarily storing a voice pattern for informing of an occurrence of an abnormal condition for each abnormality level of input data, and a unit for reading from the storing unit the voice pattern for informing of an occurrence of the abnormal condition corresponding to an abnormality level of the input data when the abnormality detection signal is output.

A voice pattern for informing of an occurrence of an abnormal condition for each abnormality level of input data is stored in the storing unit. When an abnormality detection signal is output, the voice pattern for informing of an occurrence of an abnormal condition corresponding to the abnormality level of the input data is read from the storing unit and regenerated by a speaker. Thus, an operator can recognize through his or her ears the occurrence and the level of the abnormal condition.

The fifth principle of the present invention based on the third principle comprises a storing unit for storing a voice alarm message for each abnormality level of input data, and a unit for reading from the storing unit the voice alarm message corresponding to the abnormality level of input data upon receipt of the abnormality detection signal and regenerating it through the speaker provided at a monitored object.

When a voice alarm message for each abnormality level of input data is input through a mike, it is stored in the storing unit. When an abnormality detection signal is output, a voice alarm message corresponding to the abnormality level of input data is read from the storing unit and regenerated by a speaker provided at a monitor object, thereby notifying an intruder into a monitored area of the occurrence of the abnormal condition.

The sixth principle of the present invention based on the first through the fifth principles comprises a voice data storing unit for sequentially storing voice data input through an operator mike, an operation unit for calculating a relational value between the latest voice data and preceding voice data, and a unit for storing in an internal voice data processing unit the voice data input through the operator mike when the relational value is smaller than a predetermined value.

Voice data input through the operator mike are sequentially stored in the voice data storing unit, and a relational value between the latest voice data and the preceding voice data is calculated. If the obtained relational value is smaller than a predetermined value, then the voice data input through the operator mike are stored in the voice data processing unit.

The seventh principle of the present invention based on the first through the sixth principles comprises a plurality of sensors provided for a monitor object, a unit for generating a two-dimensional distribution graph of the detection amounts on the monitor screen of the display unit based on the position and the detection amount of the sensor, and a unit for multiplexing and displaying the two-dimensional distribution graph on the monitor screen of the display unit.

A plurality of sensors are provided for a monitor object, and a two-dimensional distribution graph of the detection amount is generated on the monitor screen of the display unit based on the position and the detection amount of the sensor. Furthermore, the generated two-dimensional graph is multiplexed and displayed on the monitor screen of the display unit.

DESCRIPTION OF THE PREFERRED EMBODIMENTS

The embodiments of the present invention are explained below by referring to the attached drawings.

Figure 1:
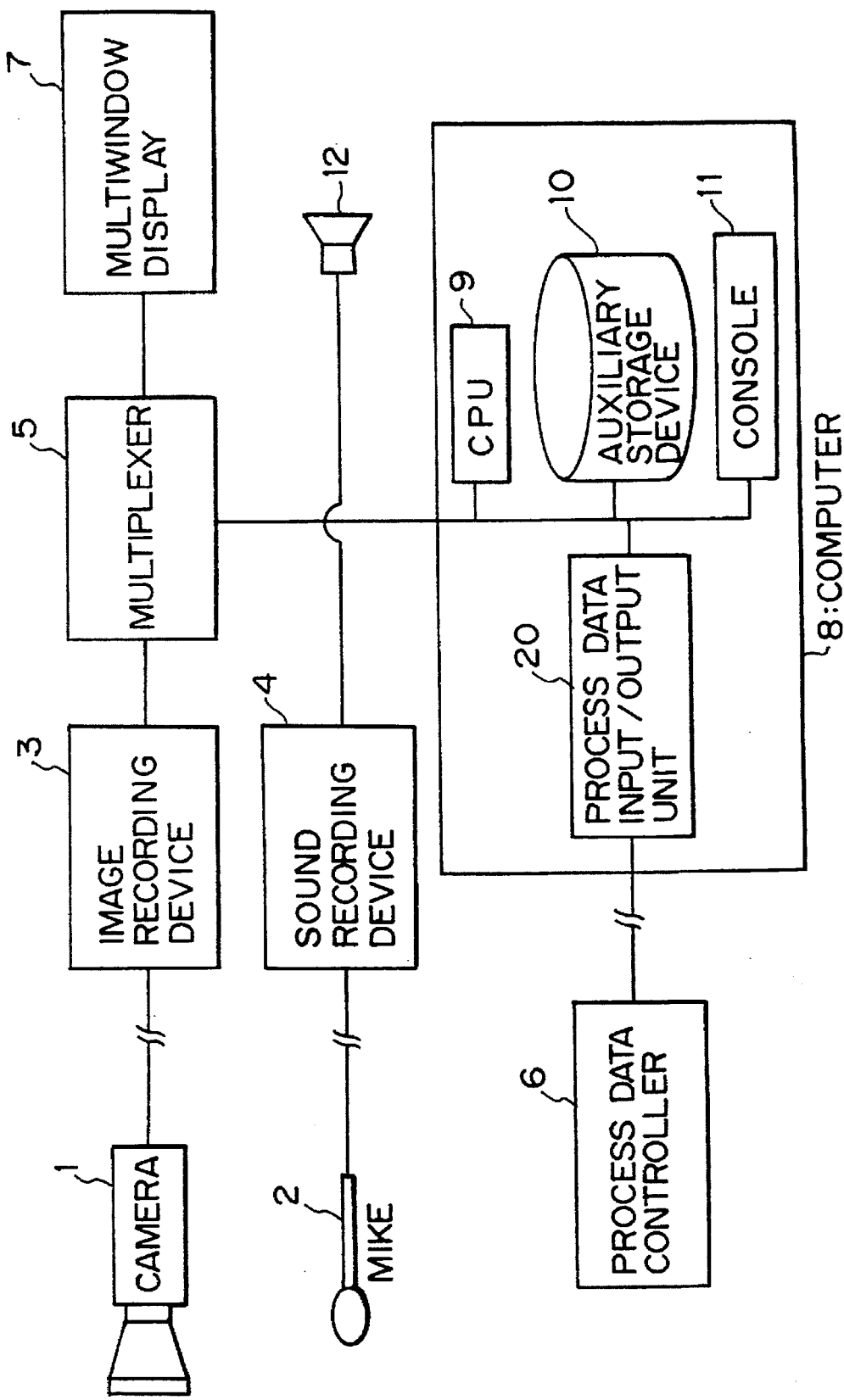
FIG. 1 is a block diagram showing the configuration of the plant monitor system of the prior art technology.
Figure 2:
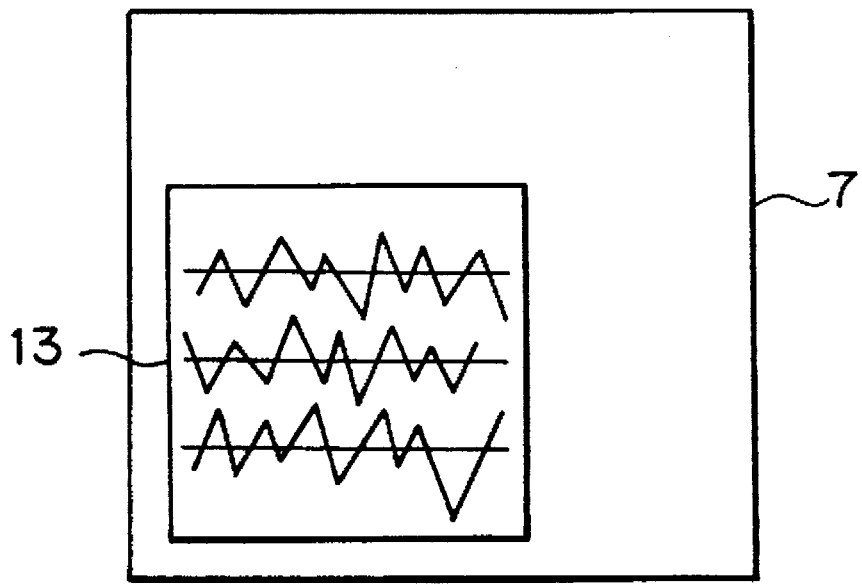
FIG. 2 shows a display example of the prior art technology.
Figure 3:
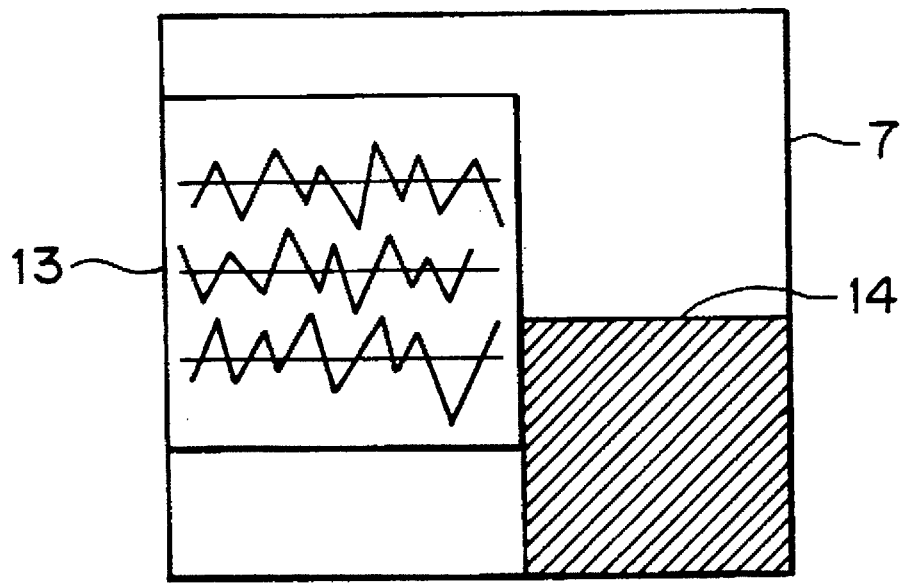
FIG. 3 shows a display example of the prior art technology.
Figure 4:
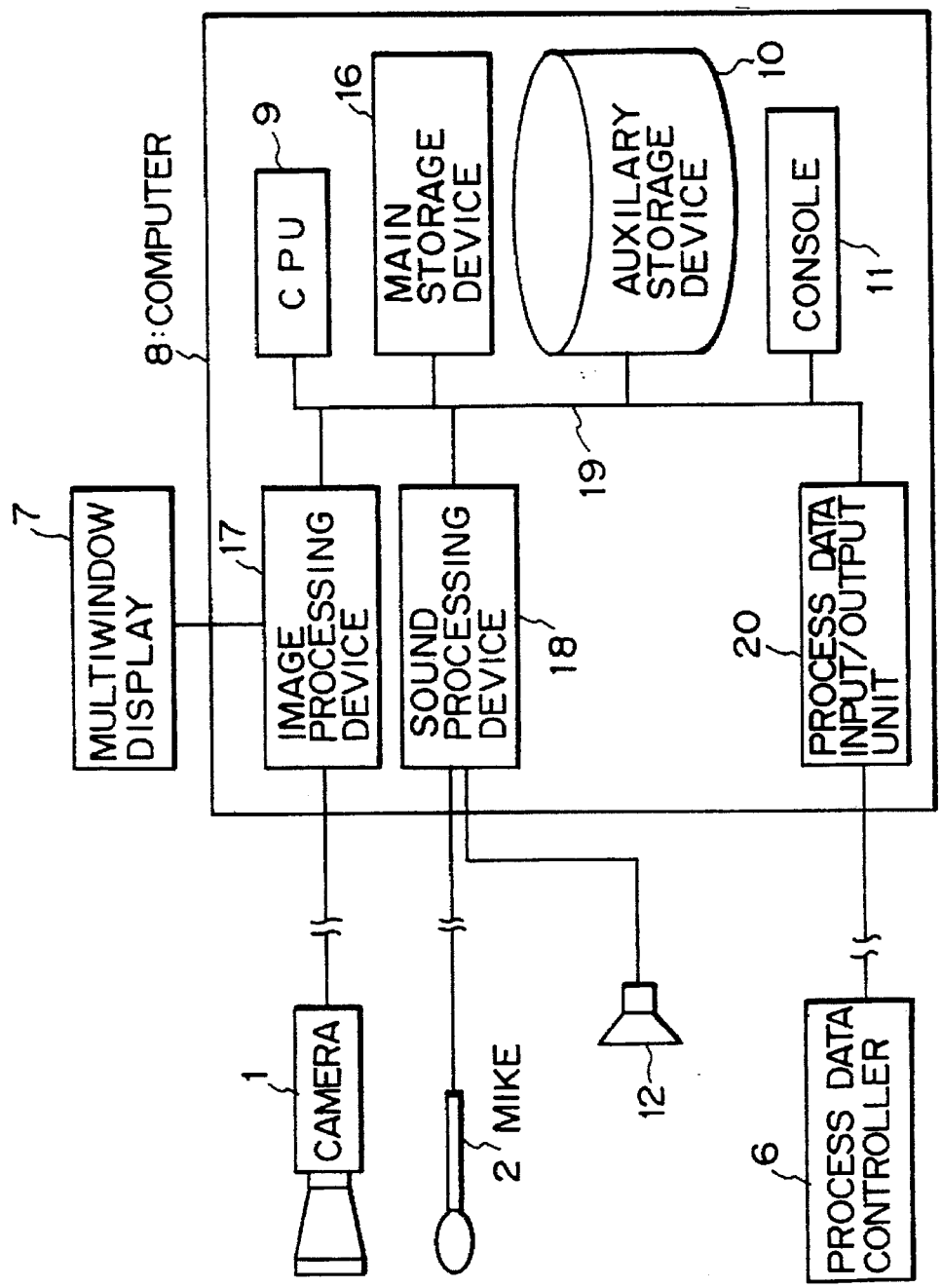
FIG. 4 is a block diagram showing the configuration of the first embodiment according to the first principle of the present invention.

FIG. 4 is the block diagram showing the configuration according to the first embodiment of the first principle of the present invention.

In FIG. 4, the monitor camera 1 captures a monitored object and transmits an image signal to an image processing device 17 in the computer 8. The mike 2 collects a sound from the monitored object and transmits a sound signal to a sound processing device 18 in the computer 8. The process data controller 6 is connected to the computer 8, controls data input/output relating to the processes on the monitored object, and transmits the data to a process data input/output unit 20 in the computer 8. The multiwindow display 7 displays the image signal transmitted from the image processing device 17 in the computer 8.

The speaker 12 regenerates the sound signal transmitted from the sound processing device 18 in the computer 8. The computer 8 manages input and output of various data and comprises the CPU 9 connected to a bus 19, a main storage device 16, the auxiliary storage device 10, the image processing device 17, the sound processing device 18, the process data input/output unit 20, and the console 11. That is, the computer 8 displays on the display 7 the image signal input from the monitor camera 1 to the image processing device 17 and process data obtained from the controller 6, and stores the data in the main storage device 16. The computer 8 also transmits to the speaker 12 the sound signal input from the mike 2 to the sound processing device 18 and stores it in the main storage device 16.

Figure 5:
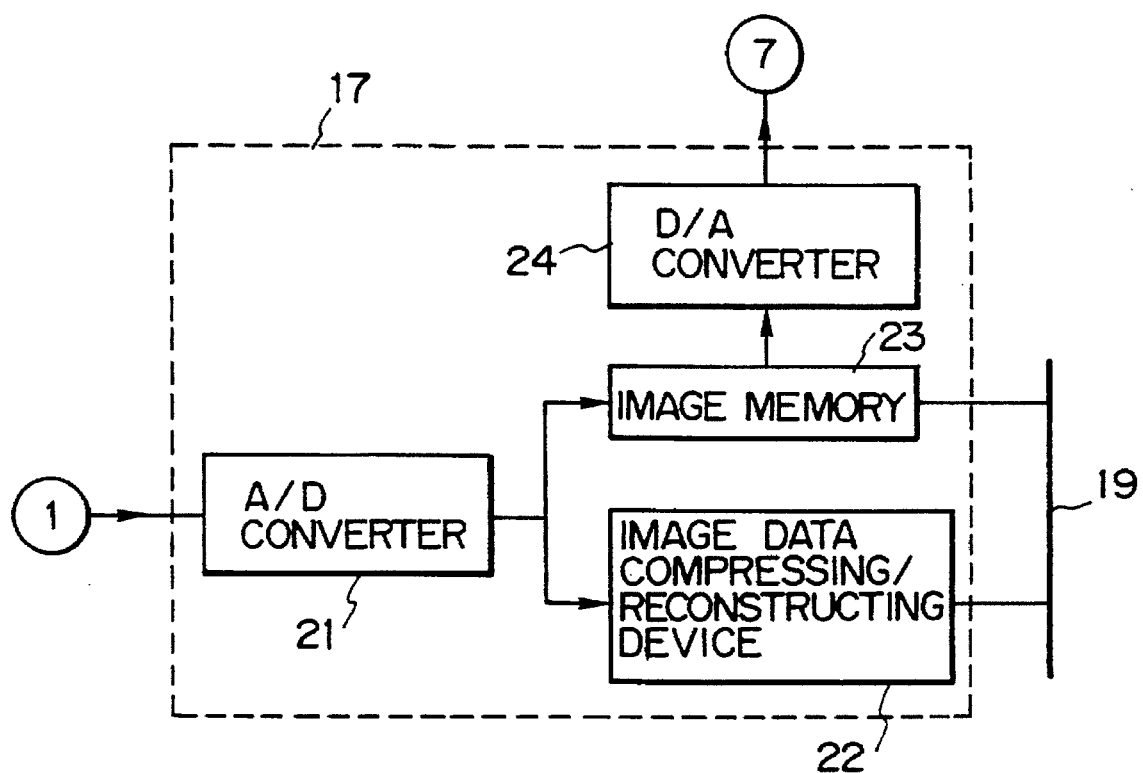
FIG. 5 is a block diagram showing the configuration of the image processing device shown in FIG. 4.

FIG. 5 is the block diagram showing the configuration of the image processing device 17.

The image processing device 17 comprises an A/D converter 21, an image data compressing/reconstructing device 22, an image memory 23, and a D/A converter 24.

The A/D converter 21 converts an image signal from the monitor camera 1 to a digital signal and transmits it to the image data compressing/reconstructing device 22 and the image memory 23.

The image data compressing/reconstructing device 22 compresses image data from the A/D converter 21, outputs them to the bus 19. It reconstructs the image data from the compressed image data input from the bus 19 when data are regenerated, and transmits them to the image memory 23.

The image memory 23 is a frame buffer for storing characters, graphics, and image data from the monitor camera 1 to be displayed on a multiwindow display. The image data are stored in the main storage device 16 through the image data compressing/reconstructing device 22. At the time of data reconstruction, image data are written to the image memory 23 through the image data compressing/reconstructing device 22. When characters, graphics, etc. are to be superposed on images, data are entered through a path which directly connects the image memory 23 to the bus 19.

The image memory 23 stores input image data, and the image data are transmitted to the D/A converter 24 at a predetermined timing. The D/A converter 24 converts image data consisting of digital signals into analog image signals and outputs them to the display 7.

Figure 6:
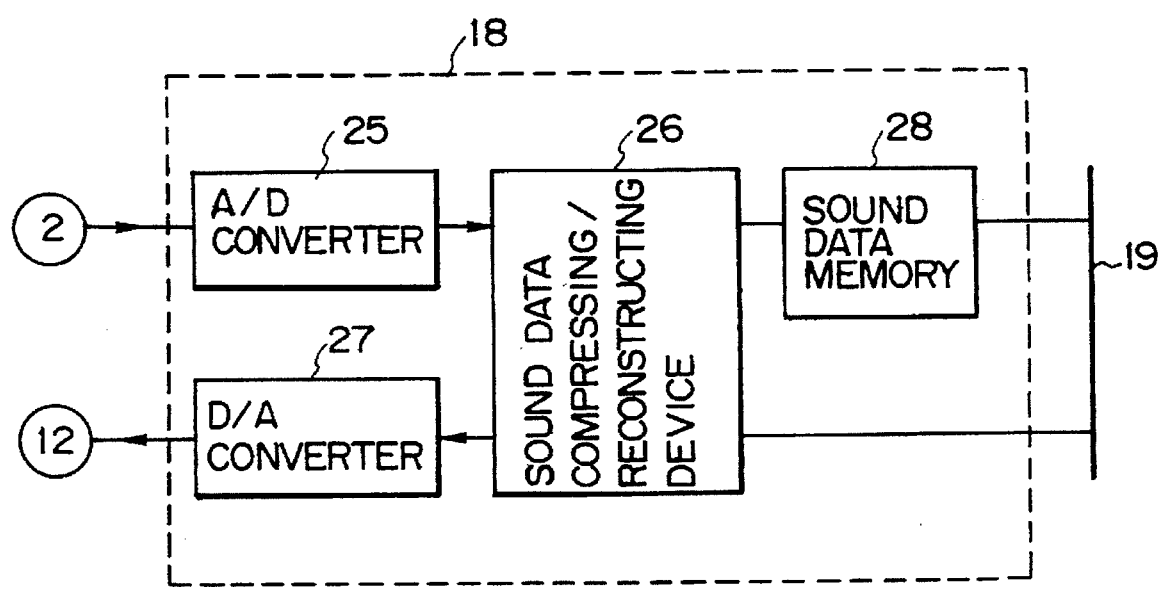
FIG. 6 is a block diagram showing the configuration of the voice processing device shown in FIG. 4.

FIG. 6 is the block diagram showing the configuration of the sound processing device 18.

The sound processing device 18 comprises an A/D converter 25, a sound data compressing/reconstructing device 26, a D/A converter 27, and a sound data memory 28.

The A/D converter 25 converts a sound signal received through the mike 2 into a digital signal, and transmits it to the sound data compressing/reconstructing device 26. The sound data compressing/reconstructing device 26 transmits the sound data received from the A/D converter 25 to the D/A converter 27, compresses the sound data, and outputs them to the bus 19 through the sound data memory 28. At the time of data reconstruction, the sound data compressing/reconstructing device 26 reconstructs the original sound data from the compressed sound data received via the bus 19 through the sound data memory 28 and transmits them to the D/A converter 27.

The sound data memory 28 functions as a buffer for temporarily storing sound data. The path directly connecting the bus 19 and the sound data compressing/reconstructing device is used to set a mode of the sound data compressing/reconstructing unit. For example, a set mode can be a compress mode or a no-compress mode.

With the above described configuration, if an abnormal condition has been detected in the process data, etc. input to the controller 6, then the data temporarily stored in the main storage device 16 for a predetermined period before and after the detection of the abnormal condition are saved in the auxiliary storage device 10. At the regeneration of data, the saved data are simultaneously and synchronously transmitted and regenerated on the display 7 and the speaker 12.

Figure 7:
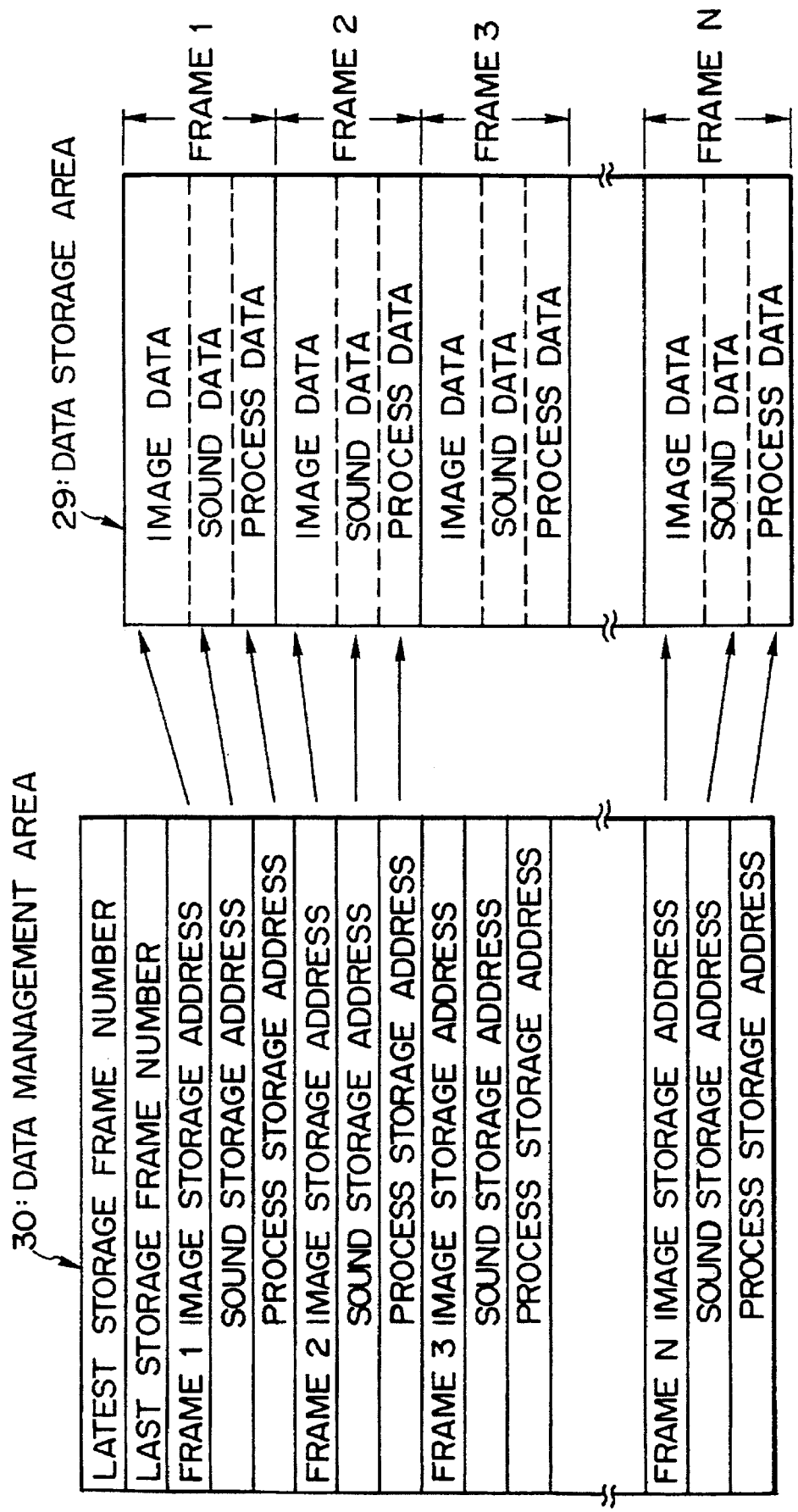
FIG. 7 shows a procedure of storing data in the main storage device shown in FIG. 4.

FIG. 7 shows the procedure of storing data in the main storage device 16. A data storage area 29 in the main storage device 16 stores image data, sound data, and process data as a set of data in a frame. A frame is a unit referring to a set of sound data and process data corresponding to a piece of static image data. A data management area 30 in the main storage device 16 stores a main storage address for each set (frame) of image data, sound data, and process data stored in data storage area 29, and also stores the latest storage frame number and the last storage frame number. The initial value of the latest storage frame number is 1, and a starting address of the data storage area 29 is stored at the image storage address corresponding to frame 1. Storing processes in these areas 29 and 30 are performed as follows.

First, image data are stored at an address of the data storage area 29 specified by the image storage address corresponding to the latest storage frame number indicated in the data management area 30. After storing the image data, the address following the end of the image data stored in the data storage area 29 is stored in the sound storage address area corresponding to the same frame number in the data management area 30.

Next, sound data are stored at an address of the data storage area 29 specified by the sound storage address corresponding to the same frame number. After storing the sound data, the address following the end of the sound data stored in the data storage area 29 is stored in the process data storage address area corresponding to the same frame number in the data management area 30.

Then, process data are stored at an address of the data storage area 29 specified by the process data storage address corresponding to the same frame number.

After storing the process data, the data storage limit address of the main storage device is compared with the address following the end of the process data. As a result, if a set of the image, sound, and process data can be sufficiently stored, then the latest storage frame number in the data management area 29 is updated and the image data storage address area corresponding to the updated number stores the address following the compared end of the process data.

If the comparison result indicates that a set of data cannot be sufficiently stored, the latest storage frame number in the data management area 29 is set to 1, and the last frame number is stored in the last frame number area. If data have been stored up to the last frame, then control is returned to the heading frame number and data are cyclically stored in the data storage area 29.

According to the present embodiment, the size of sound data and process data is fixed. However, the size of compressed image data varies for each frame in case, for example, an abnormal condition arises. If the size of image data is larger than that in the same frame of the previous cycle, then storing the data may destroy the next frame area. Therefore, if the size of image data is larger than that in the same frame of the previous cycle, that is, if the next frame data area of the previous cycle can be destroyed, then the image storage address of the next frame in the data management area is set to a specific value, for example, zero temporarily. Then, the sound data and process data of the present frame are stored and the above described normal processing follows.

When data are regenerated and the image storage address of the regeneration start frame number (oldest frame number) indicates 0, then the data are regenerated from the succeeding frame number. That is, the image storage address 0 indicates that the frame data are destroyed.

According to the present embodiment, if an abnormal condition is detected in a monitor process and an operator inputs through the console 11, etc. an instruction to regenerate data, then the data before and after the abnormal condition, which are saved from the main storage device 16 to the auxiliary storage device 10 upon detection of the abnormal condition, are reconstructed by the image processing device 17 and the sound processing device 18, and transmitted to the display 7 and the speaker 12 for regeneration. Data are regenerated from the oldest number to the latest number. The oldest frame number remains "1" before data are fully stored in the data storage area. Once the data have been fully stored in the data storage area, it is assigned the latest frame number plus 1. Since the data are managed using frame numbers, they can be roughly synchronized at the time of data regeneration. Furthermore, they are timely adjusted in the buffer memories of the image processing device and the sound processing device. Since the data are synchronized while being regenerated, the cause of the abnormal condition can be analyzed from various points of view. As a result, the present invention makes it possible to efficiently and appropriately take proper action against an abnormal condition. Furthermore, the validity of a reconstructing operation can be appropriately rechecked.

Figure 8:
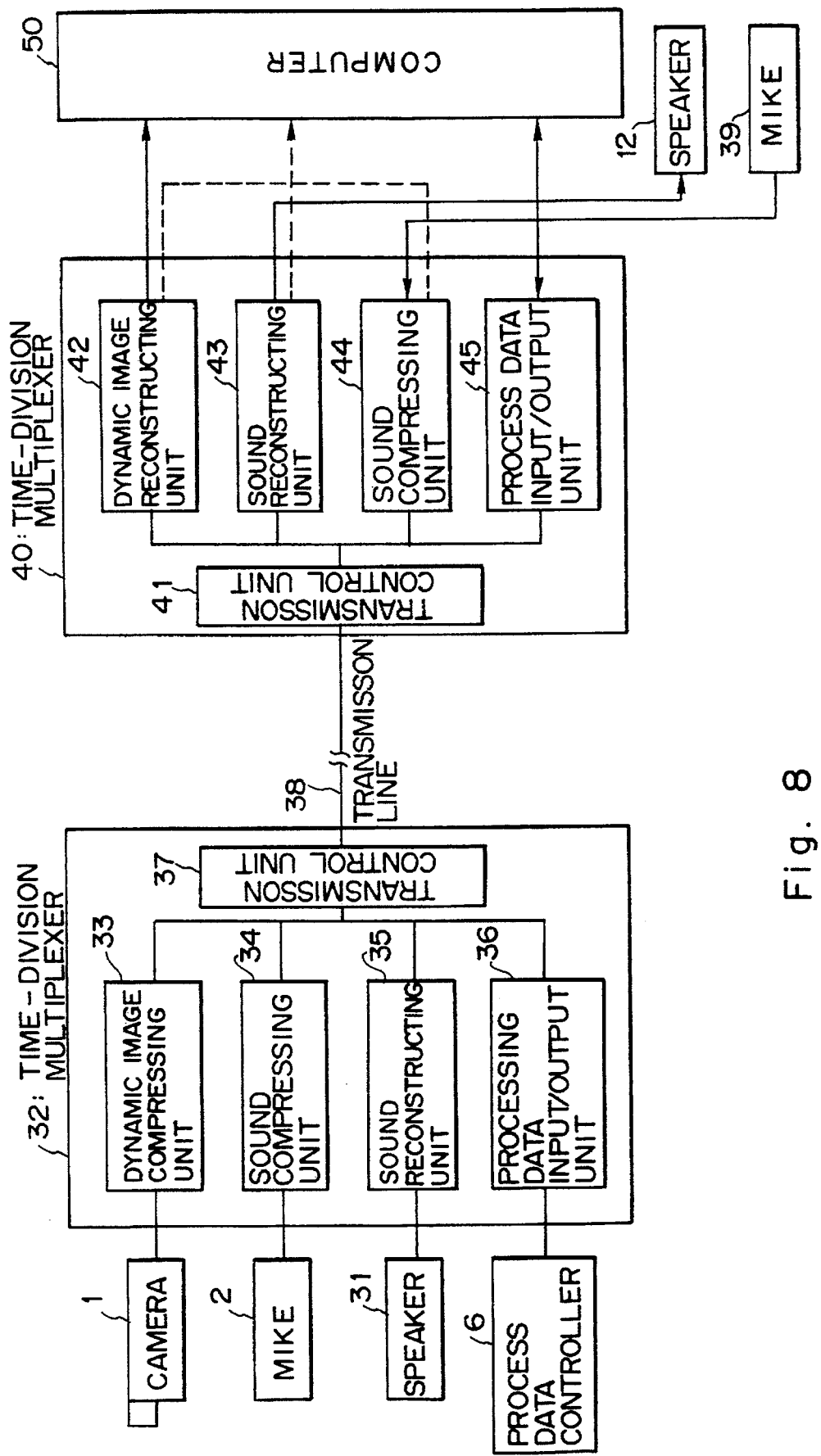
FIG. 8 is a block diagram showing the configuration of the second embodiment according to the first principle.

FIG. 8 is the block diagram showing the configuration of the second embodiment according to the first principle of the present invention.

According to the present embodiment, the monitored object and the operator's device are located separately. Thus, they are connected to each other via a transmission line 38 through time division multiplexer (TDM) 32 and 40. That is, in FIG. 8, an image signal from the monitor camera 1 and a sound signal from the mike 2 are applied to a dynamic image compressing unit 33 in the TDM 32 and a sound compressing unit 34 respectively, converted into digital signals and compressed. Likewise, the process data controller 6 is connected to a process data input/output unit 36 in the TDM 32 for input/output of process data such as measurement data, device setting data, etc. The compressed image data, sound data, and process data are multiplexed through time division by a transmission control unit and output to the transmission line 38.

Figure 9:
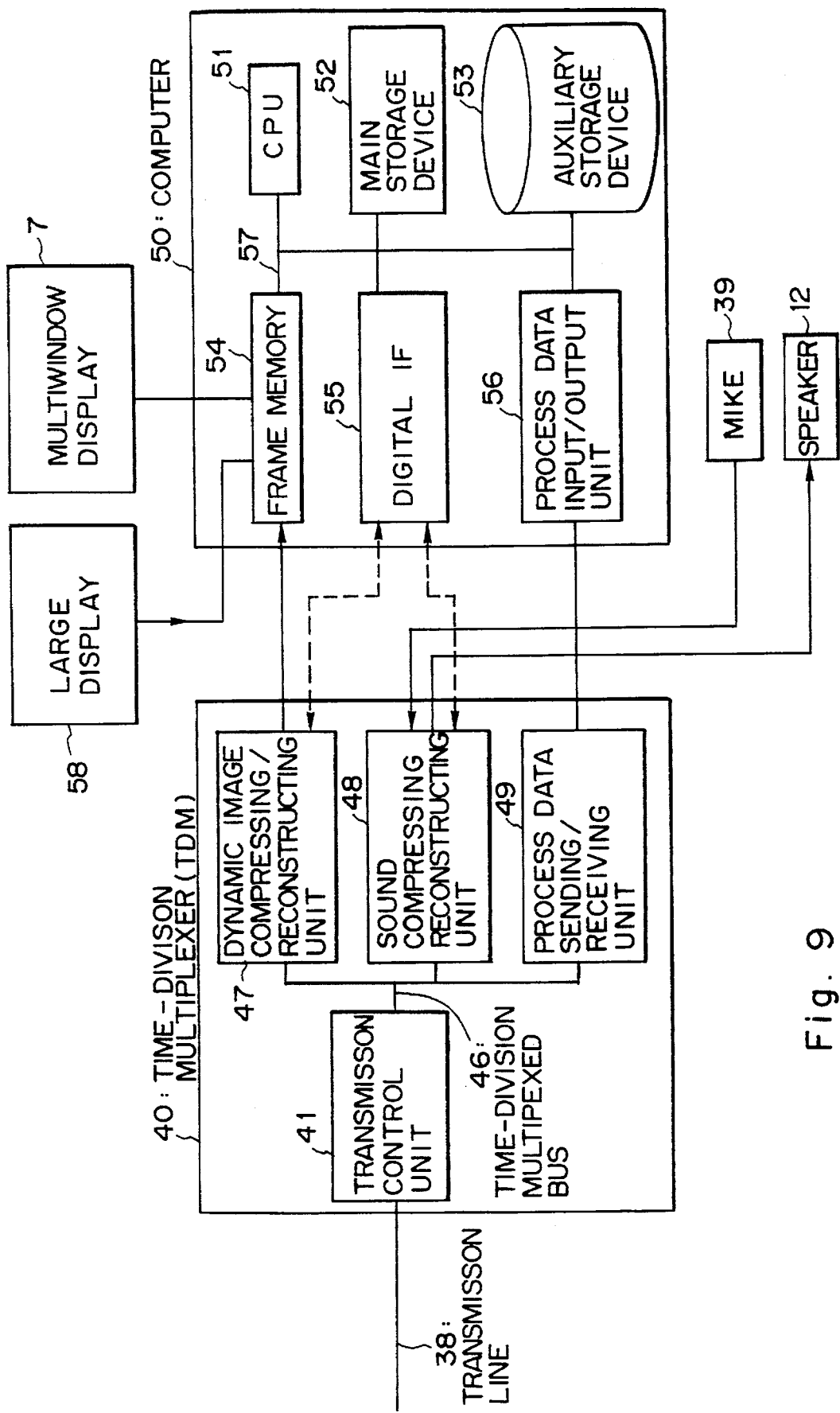
FIG. 9 is a block diagram showing the configuration of the main portions shown in FIG. 8.

Described below is a TDM 40 and a computer 50 connected to another end of the transmission line 38 by referring to FIG. 9. FIG. 9 is the block diagram showing in detail the TDM 40 and the computer 50. The data input to the TDM 40 via the transmission line 38 are isolated by a transmission control unit 41. The isolated image data are transmitted to a dynamic image compressing/reconstructing unit 47 via a time division multiplexed bus 46. Similarly, the sound data are transmitted to a sound compressing/reconstructing unit 48, and the process data are transmitted to a process data sending/receiving unit 49.

The dynamic image compressing/reconstructing unit 47 reconstructs the input image data and transmits them to a frame memory 54 in the computer 50. The sound compressing/reconstructing unit 48 reconstructs the input sound data and transmits them to the external speaker 12 for regeneration, and inputs sound data applied to a mike 39. Since the dynamic image compressing/reconstructing unit 47 and the sound compressing/reconstructing unit 48 are connected to a digital interface (IF) 55 in the computer 50, the image and sound data are applied to the computer 50 and can be transmitted from the computer 50 to the TDM 40.

Furthermore, the process data sending/receiving unit 49 is connected to the process data input/output unit 56 in the computer 50 and sends and receives data to and from the process data input/output unit 56.

The frame memory 54, the digital IF 55, and the process data input/output unit 56 are connected to a CPU 51, a main storage device 52, and an auxiliary storage unit 53 via a bus 57. The frame memory 54 are also connected to the multiwindow display 7 and a large display 58 to display images of a monitored object, process data, etc.

Figure 10:
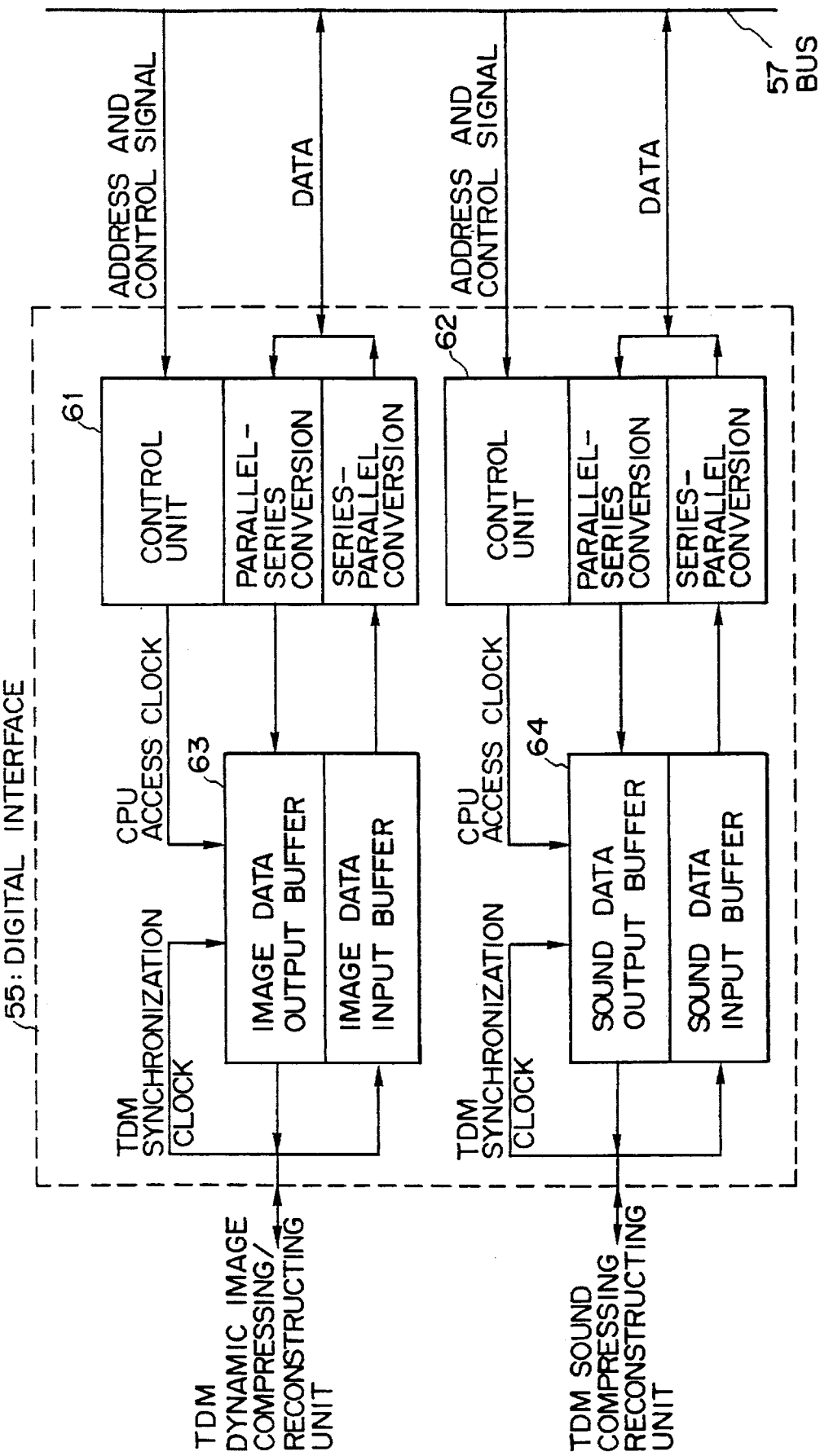
FIG. 10 is a block diagram showing the configuration of the main portions shown in FIG. 9.

FIG. 10 is the block diagram showing the configuration of the digital IF 55. The digital IF 55 comprises control units 61 and 62, and an input/output buffers 63 and 64 having a FIFO (first-in-first-out) function. It can be accessed from the TDM 40 and the computer 50. That is, the input/output buffers 63 and 64 are accessed by operating the control units 61 and 62 with the synchronization clock of the TDM when the digital IF 55 is accessed from the TDM 40, and with the access clock of the CPU 51 when it is accessed from the CPU 51.

Figure 11:
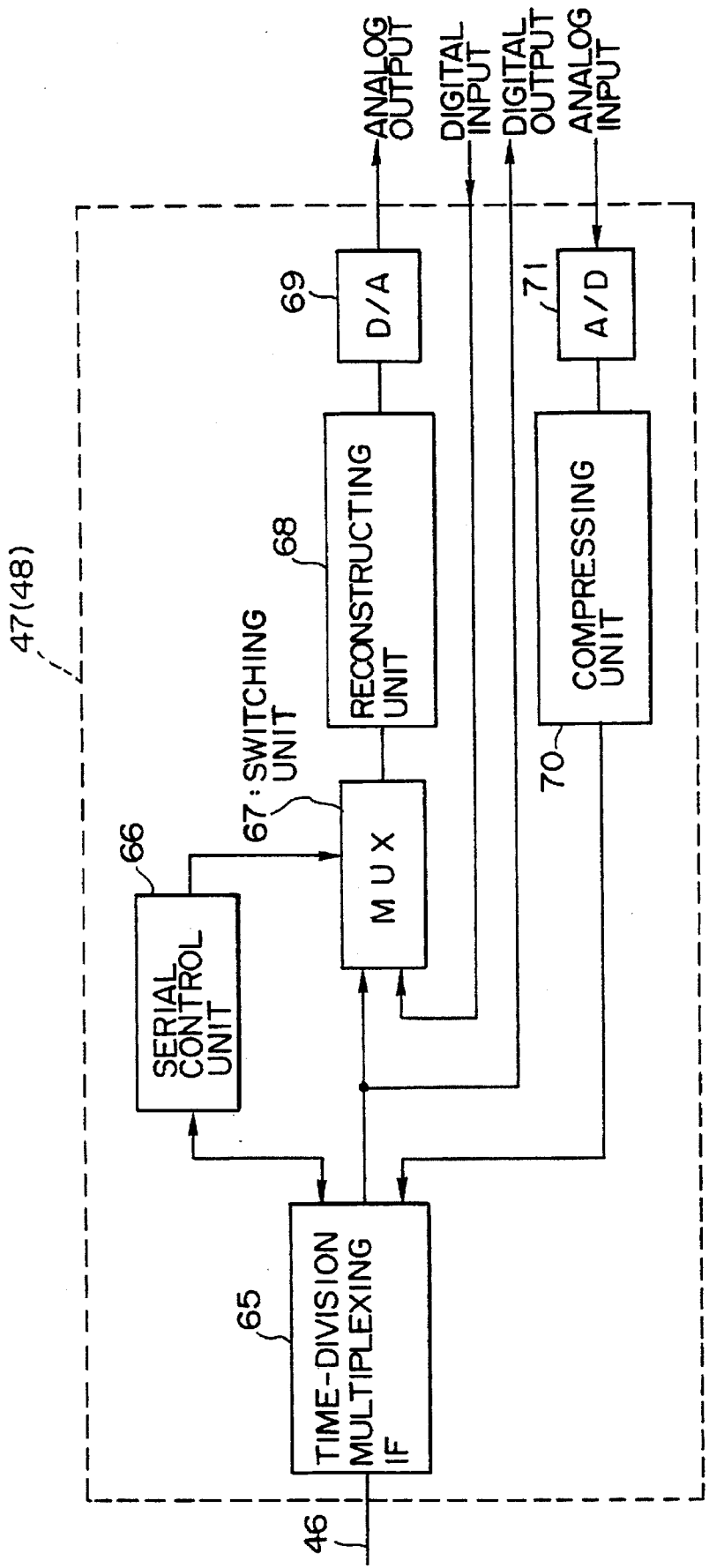
FIG. 11 is a block diagram showing the configuration of the main portions shown in FIG. 9.

FIG. 11 is the block diagram showing the configuration of the dynamic image compressing/reconstructing unit 47 in the TDM 40. The dynamic image compressing/reconstructing unit 47 comprises a time-division multiplexing interface (IF) 65, a serial control unit 66, a switching unit (MUX) 67, a reconstructing unit 68, a D/A converter 69, a compressing unit 70, and an A/D converter 71. Data input either from the time division multiplexed bus through the time-division multiplexing IF 65 or from the computer 50 are selected by switching the setting of the switching unit 67, and are then output as analog data through the reconstructing unit 68 and the D/A converter 69. The configuration of the sound compressing/reconstructing unit 48 is similar to the above described configuration of the dynamic image compressing/reconstructing unit 47.

According to the second embodiment having the above configuration, when the sound and image data are compressed by the TDM 32 and applied to the digital IF 55 in the computer 50 through the transmission line 38 and the TDM 40 in time series, they are temporarily stored in the input/output buffers 63 and 64 in the digital IF 55, and then stored in the main storage unit 52 by access from the CPU 51. They are stored in the main storage device 52 or saved in the auxiliary storage device 53 in case of an abnormal condition in the same way as the first embodiment. Therefore, the detailed explanation involved is omitted here.

When data are regenerated after being saved in the auxiliary storage device 53, the data path is switched to a digital input from the computer 50 by switching the setting of the switching unit 67 of each of the dynamic image compressing/reconstructing unit 47 and the sound compressing/reconstructing unit 48 in the TDM 40. Thus, the image and sound data read from the auxiliary storage device 53 are synchronously regenerated through the multiwindow display 7, the large display 58, or the speaker 12. As a result, the present embodiment obtains the same effect as the first embodiment.

Figure 12:
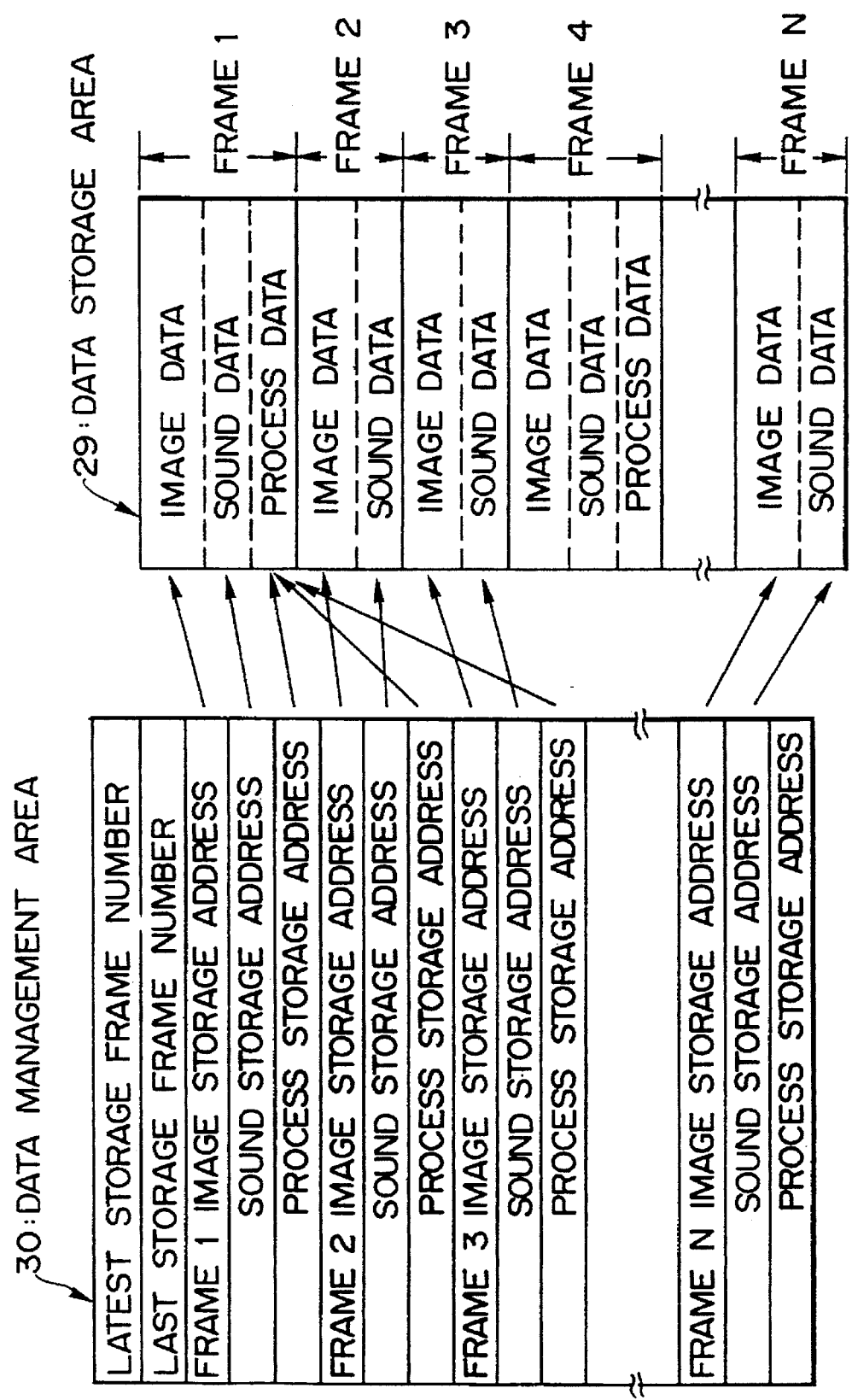
FIG. 12 shows a procedure of processing of the third embodiment according to the second principle.

Described next is the third embodiment according to the second principle of the present invention. The third embodiment is based on the second embodiment, and relates to the processing performed by the CPUs 9 and 51 when they store process data in the main storage devices 16 and 52 in the computers 8 and 50. FIG. 12 shows the operation of the third embodiment. In FIG. 12, the data storage areas 29 of the main storage devices 16 and 52 store in frame units image data, sound data, and process data collected also in frame units. The first frame 1 stores all of image data, sound data, and process data.

For the next frame 2, the collected process data are compared with the process data in frame 1, and determined whether or not they match each other. If so, frame 2 stores only image data and sound data without storing process data. Likewise, the process data in frame 3 are also compared with those in frame 1. In FIG. 12, they match each other and therefore are not stored. In the next frame 4, the process data are different from those in frame 1 and stored.

Then, the process data newly stored in frame 4 are used for comparison. If no process data are stored for a frame, then it indicates that the process data in the frame match those in the previous frame. In this case, the address in the data storage area 29 at which the same process data are stored is written in the process storage address in the data management area 30. Thus, although the process data are not stored, the same data can be read from another frame and saved in frame units when the data are saved later in the auxiliary storage devices 10 and 53.

In FIG. 9, if data are stored up to frame N and the data are rewritten for frame 1, the process data in frames 2 and 3 are lost. In this case, the process data in frame 1 are copied in an area reserved in addition to the data management area, and the starting address of the area is written into the process storage address in frames 2 and 3 in the data management area.

The relationship between the data management area 30 and the data storage area 29 is the same as that (shown in FIG. 7) according to the first embodiment, and therefore the explanation is omitted here.

As described above, process data are stored in the data storage area 29 only when they are different from those in preceding frames, thereby allowing the more image data to be stored and efficiently utilizing the data storage area 29. Especially, the more image data are provided, the higher the quality of images becomes and the more image data information are used in the analysis of the cause of an abnormal condition, thereby easily detecting the cause of the abnormal condition.

Figure 13:
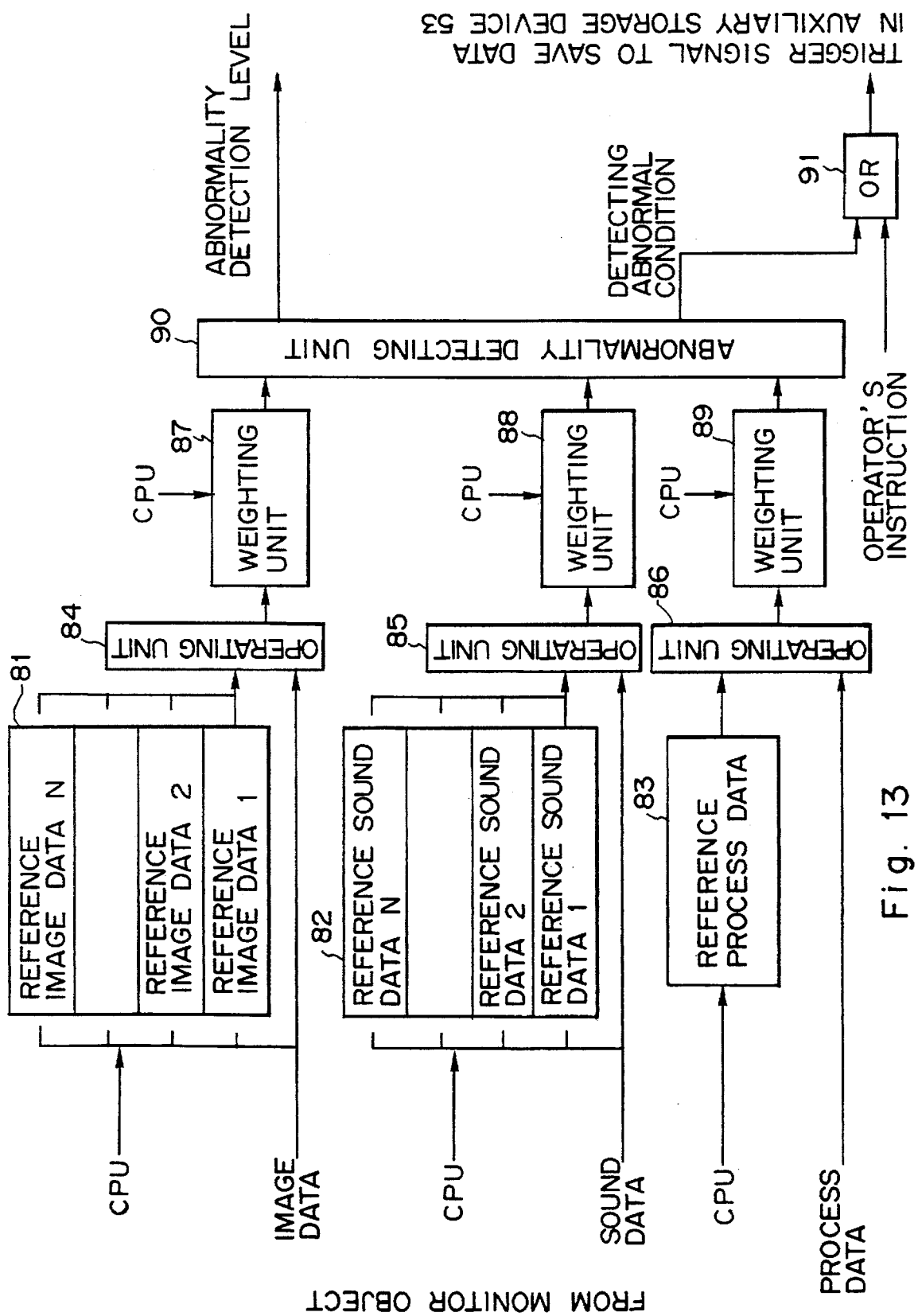
FIG. 13 is a block diagram showing the concept of processing of the fourth embodiment according to the third principle.

Described below is the fourth embodiment associated with the third principle of the present invention. The embodiment is based on the second embodiment and an abnormal condition of a monitor object and its level are automatically detected by the CPU 51 based on the image, sound, and process data input in the computer 50. FIG. 13 is the block diagram showing the concept of the processing operation according to the fourth embodiment. In FIG. 13, when image data and sound data are input, they are compared with predetermined reference image data 81 and reference sound data 82 through operating units 84 and 85.

The reference image data 81 and reference sound data 82 are generated as data divided into N levels from a normal state to an abnormal state. Normal data refer to data collected from a state in which they are normally operated, while abnormal data are erroneous data which have actually arisen previously or are artificially generated.

When process data are input, they are compared with predetermined reference process data 83 by an operating unit 86. The reference process data 83 are composed of an upper limit and a lower limit of reference values.

Furthermore, the operating units 84 and 85 compare sums of absolute values of differences between input data and reference data for each sample, and performs a relational operation to determine the most similar pattern.

Since approximate values can serve as operation results from the operating units 84 and 85, operations for image data are performed using the low band components of DCT (discrete cosine transform) or the direct current components, while operations for sound data are performed using band-divided low band data. Thus, the operating time can be considerably shortened. The operating unit 86 compares a current input process data with a reference value of reference process data.

Thus, the similarity between process data and reference data at each level is obtained as a result of a relational operation by each of the operating units 84 through 86, transmitted to weighting units 87 through 89 to weight each of the reference data, and then transmitted to an abnormality detecting unit 90. The abnormality detecting unit 90 determines an abnormality level of the input data based on the weighted similarity with each piece of reference data, outputs it as an abnormality detection level, and compares the abnormality detection level of input data with a predetermined threshold. If the abnormality level of the input data exceeds the threshold, then the monitor object is regarded as being abnormal and the abnormality detecting unit 90 outputs an abnormality detection signal. The abnormality detection signal is connected to an OR circuit 91 and the ORed signal is used as a trigger signal to save data into the auxiliary storage device 53.

Figure 14:
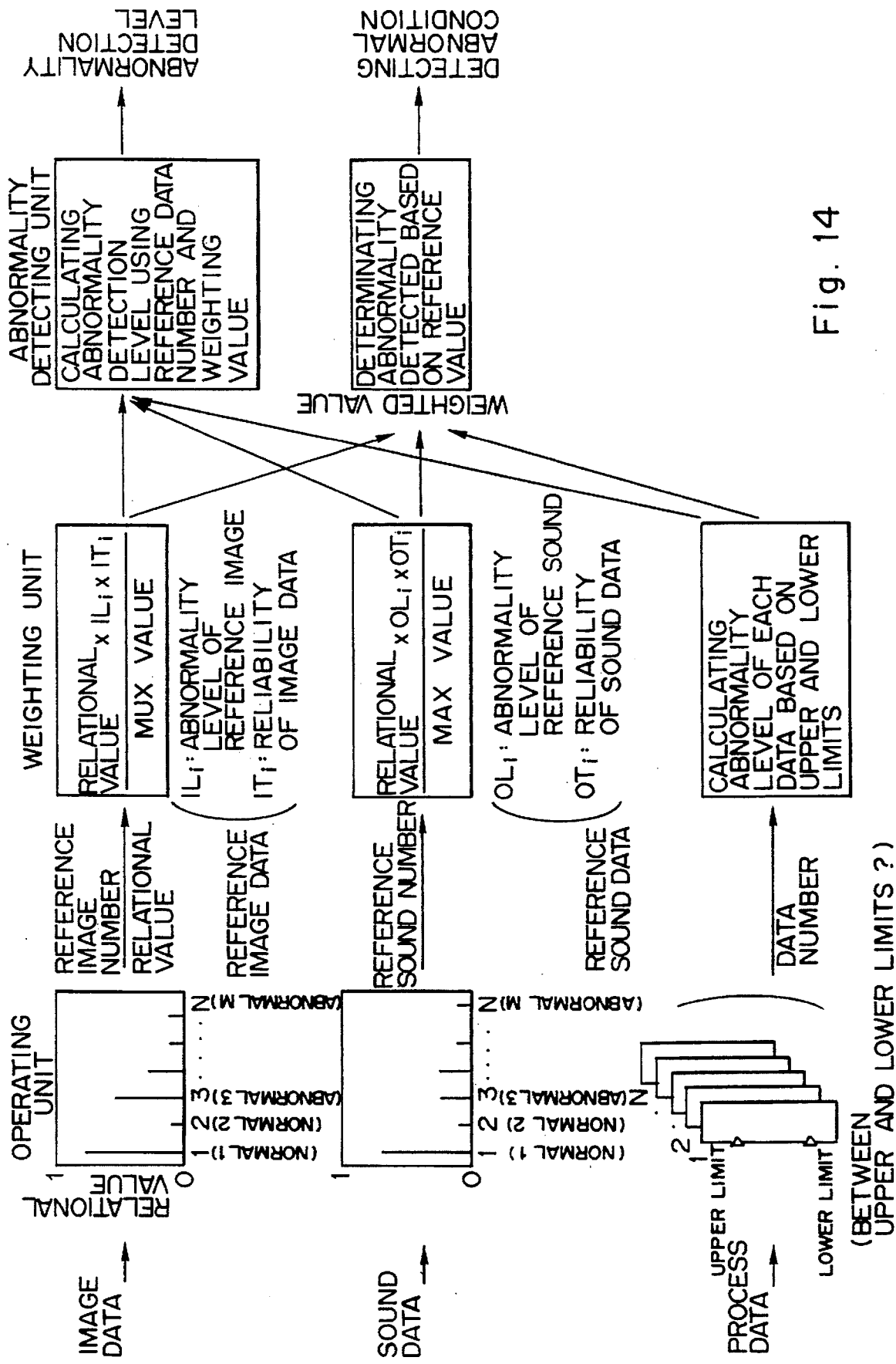
FIG. 14 shows a method of performing the process shown in FIG. 13.

FIG. 14 shows the processing procedure shown in FIG. 13. In FIG. 14, the operating unit obtains a relational value between the input image/sound data and reference data. The number of the reference data having the highest relational value and the relational information value indicating the relational level are output. It is determined whether or not input process data are between the upper and lower limits. The weighting unit weights the mutual importance (reliability) among image data, sound data, and process data, and reference data. The MAX value is used for normalization.

Based on the three kinds of weighted data, the abnormality detecting unit outputs each of abnormality levels and compares it with a predetermined reference value as a threshold. If the abnormality level exceeds the threshold, then an abnormality detection signal is output. An output of the abnormality detection signal or a fetch request through an operator's instruction saves into the auxiliary storage device 53 the data stored in the main storage device 52. As described above, it is automatically determined whether or not an abnormal condition exists in a monitor object based on input image, sound, and process data in the present embodiment, thereby attenuating the load on an operator and greatly improving the reliability.

Figure 15:
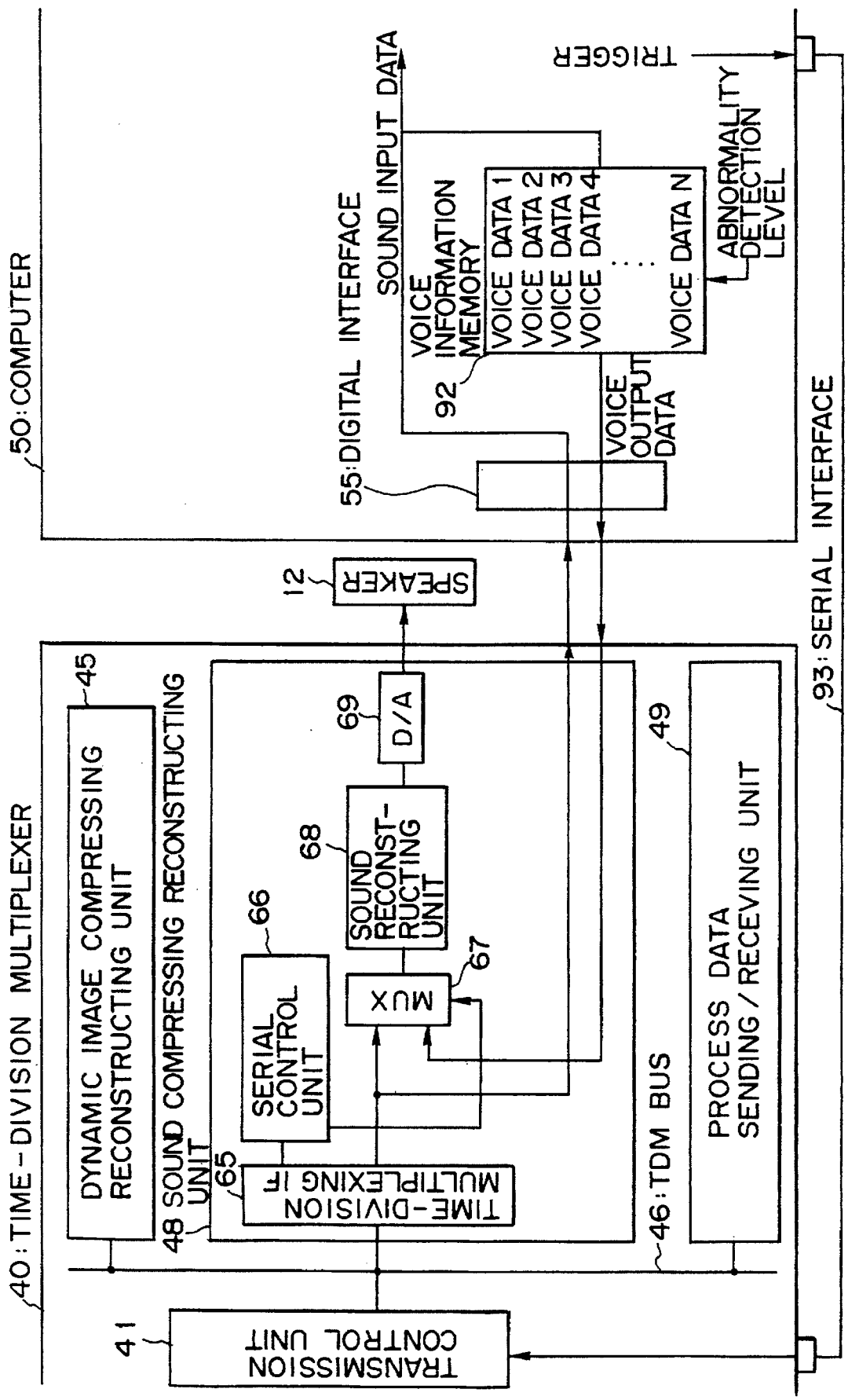
FIG. 15 is a block diagram showing the configuration of the fifth embodiment of the fourth principle.

Described below is the fifth embodiment associated with the fourth principle of the present invention. The embodiment is based on the fourth embodiment and an abnormality level is provided through a voice message for an operator when an abnormal condition is detected. FIG. 15 is the block diagram showing the configuration of the fifth embodiment. In FIG. 15, a voice information memory 92 for storing voice data 1 through N is provided in the computer 50. A serial interface (IF) 93 such as an RS-232C, etc. connects the computer 50 to the transmission control unit 41 in the TDM 40. Voice data 1 through N are voice patterns to be provided for an operator depending on a detected abnormality level.

The configuration of the sound compressing/reconstructing 48 in the TDM 40 is the same as that shown in FIG. 11. The serial control unit 66 communicates with the transmission control unit 41 through the time-division multiplexing IF 65 so that a setting of a mode and a status are transmitted. With the configuration, if the abnormality detecting unit 90 (shown in FIG. 13) in the computer 50 detects an abnormal condition in input data, then a trigger signal is transmitted to the serial control unit 66 through the serial IF 93 and through the transmission control unit 41 and the time-division multiplexing IF 65 in the TDM 40.

When the serial control unit 66 receives a trigger signal, it switches the setting of the switching unit 67, and the data path to the sound reconstructing unit 68 is switched to a digital output from the computer 50.

Simultaneously, the computer 50 reads from the voice information memory 92 voice data corresponding to the abnormality detection level from the abnormality detecting unit 90, and transmits them to the sound reconstructing-unit 68 through the digital IF 55 and the switching unit 67. Thus, voice data indicating an abnormality level are transmitted to the speaker 12 through the D/A converter 69 for regeneration, and the operator is informed through voice message of the occurrence of abnormal condition and its level.

As described above, even if an abnormal condition arises while an operator keeps his or her eyes off the multiwindow display 7 or the large display 58, the occurrence and the level of the abnormal condition can be immediately detected and an appropriate action can be taken quickly, thereby greatly improving the operability and attenuating the load on the operator.

Figure 16:
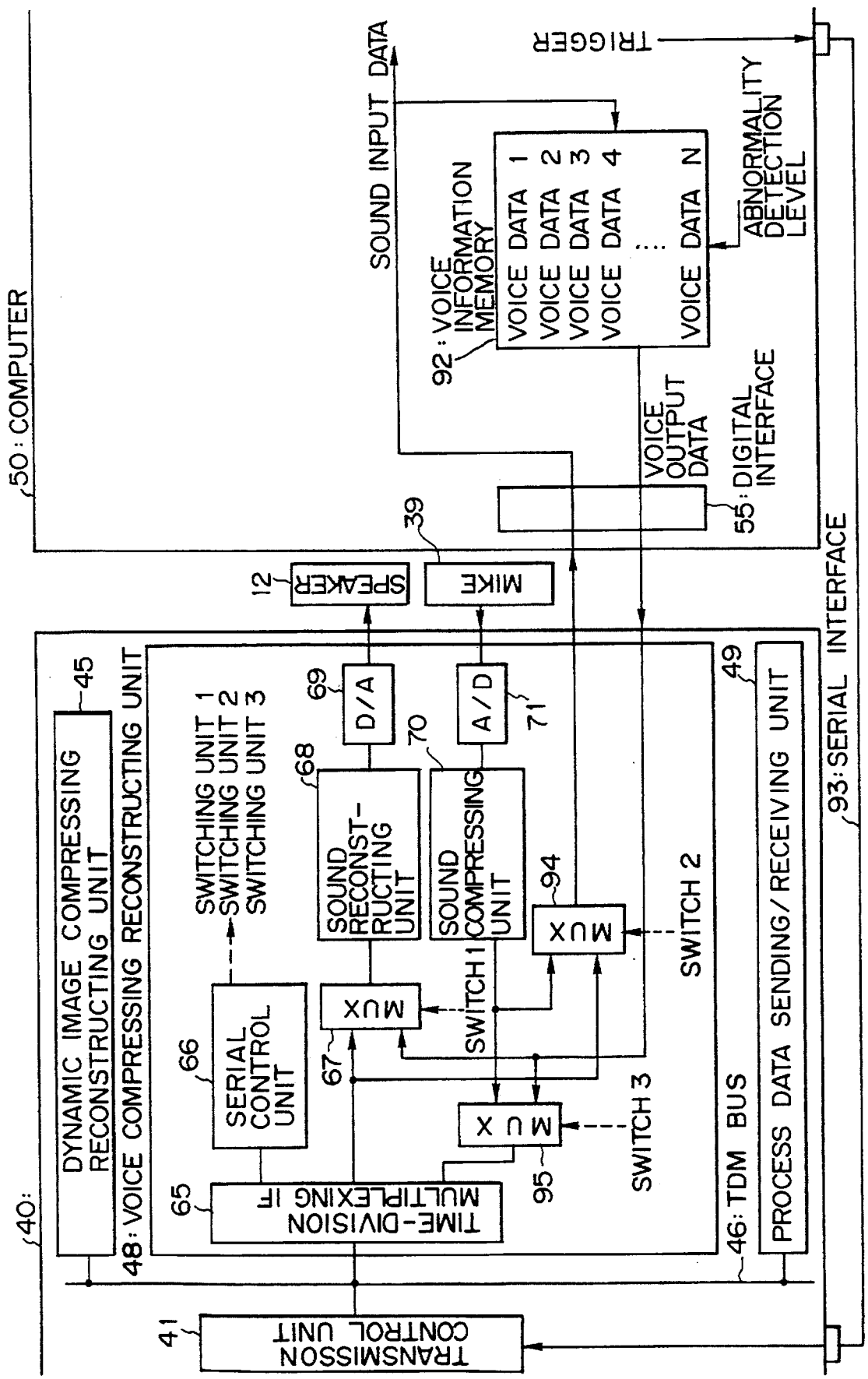
FIG. 16 is a block diagram showing the configuration of the sixth embodiment according to the fifth principle.

Then, the sixth embodiment associated with the fifth principle of the present invention is described below. The embodiment issues a warning with a voice message depending on the level of an abnormal condition to an intruder in a monitor area when an abnormal condition arises. FIG. 16 is the block diagram showing the configuration of the sixth embodiment. In FIG. 16, the voice information memory 92 for storing voice data 1 through N is provided in the computer 50, and the serial IF 93 connects the computer 50 to the transmission control unit 41 in the TDM 40. Voice data 1 through N are voice messages to be regenerated corresponding to a detected abnormality level in a monitor area.

The sound compressing/reconstructing unit 48 in the TDM 40 has the configuration shown in FIG. 11 plus switching units (MUX) 94 and 95. The switching units 94 and 95 is switched at an instruction transmitted from the computer 50 to the serial control unit 66 through the serial IF 93, the transmission control unit 41, and the time-division multiplexing IF 65. Furthermore, the serial control unit 66 communicates with the transmission control unit 41 through the time-division multiplexing IF 65 to inform of the setting of each mode and a status. With the configuration, the switching unit 94 is first switched and a data input path is established from the mike 39 to the A/D converter 71, the sound compressing unit 70, the switching unit 94, and the digital IF 55.

Next, using the mike 39 a plurality of voice messages are input and stored as voice data 1 through N in the voice information memory 92 in the computer 50. The voice message provides a warning as voice information depending on an abnormality level for an intruder in a monitor area when an abnormal condition arises. After a plurality of voice messages are recorded depending on an abnormality level, the setting of the switching unit 94 is switched again, and the data from the TDM 32 at the monitored object side, which are input to the time-division multiplexing IF 65 through the transmission control unit 41, are input to the computer 50.

Switching the setting of the switching unit 95 transmits to the transmission line 38 through the time-division multiplexing IF 65 and the transmission control unit 41 either a voice message read from the voice information memory 92 or a voice data input to the mike 39. That is, a voice message or an input voice from the mike 39 can be regenerated by the speaker 31 connected to the TDM 32 at the monitored object side.

With the configuration, when the abnormality detecting unit 90 (shown in FIG. 13) in the computer 50 detects an abnormal condition in input data, a trigger signal is transmitted to the serial control unit 66 through the serial IF 93, and through the transmission control unit. 41 and the time-division multiplexing IF 65 in the TDM 40. If the serial control unit 66 receives the trigger signal, it switches the setting of the switching unit 95 and a data path is established such that a digital output from the computer 50 is transmitted to the transmission line 38 through the time-division multiplexing IF 65 and the transmission control unit 41.

Simultaneously, the computer 50 reads from voice data 1 through N in the voice information memory 92 a voice message corresponding to an abnormality level from the abnormality detecting unit 90, and applies it to the sound compressing/reconstructing unit 48 through the digital IF 55. Then, the voice message is transmitted to the transmission line 38 through the switching unit 95, the time-division multiplexing IF 65, and the transmission control unit 41, and is regenerated by the speaker 31 connected to the TDM 32 at the monitored area side. As in the fifth embodiment, switching the setting of the switching unit 67 when an abnormal condition is detected regenerates a voice message through the speaker 12. Therefore, the operator can recognize the occurrence and the level of the abnormal condition through the voice message.

As described above, the present embodiment automatically provides a warning of a voice message depending on the level of an abnormal condition for an intruder in a monitor area. Accordingly, even if an abnormal condition arises while the operator is away, the warning can be provided for the intruder in the monitor area without fail, thereby attenuating the load on the operator and greatly improving the security and reliability.

Figure 17:
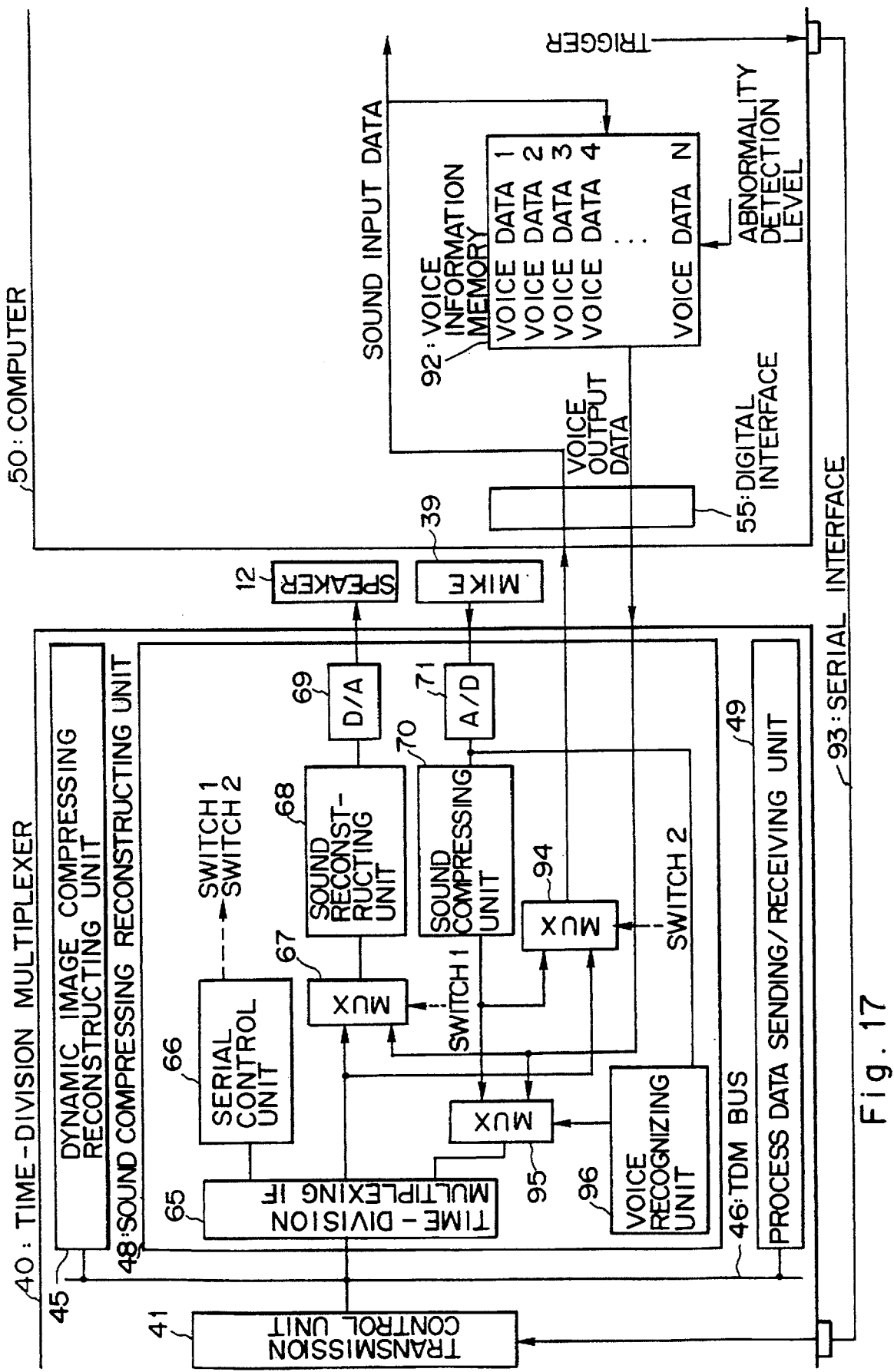
FIG. 17 is a block diagram showing the configuration of the seventh embodiment according to the sixth principle.
Figure 18:
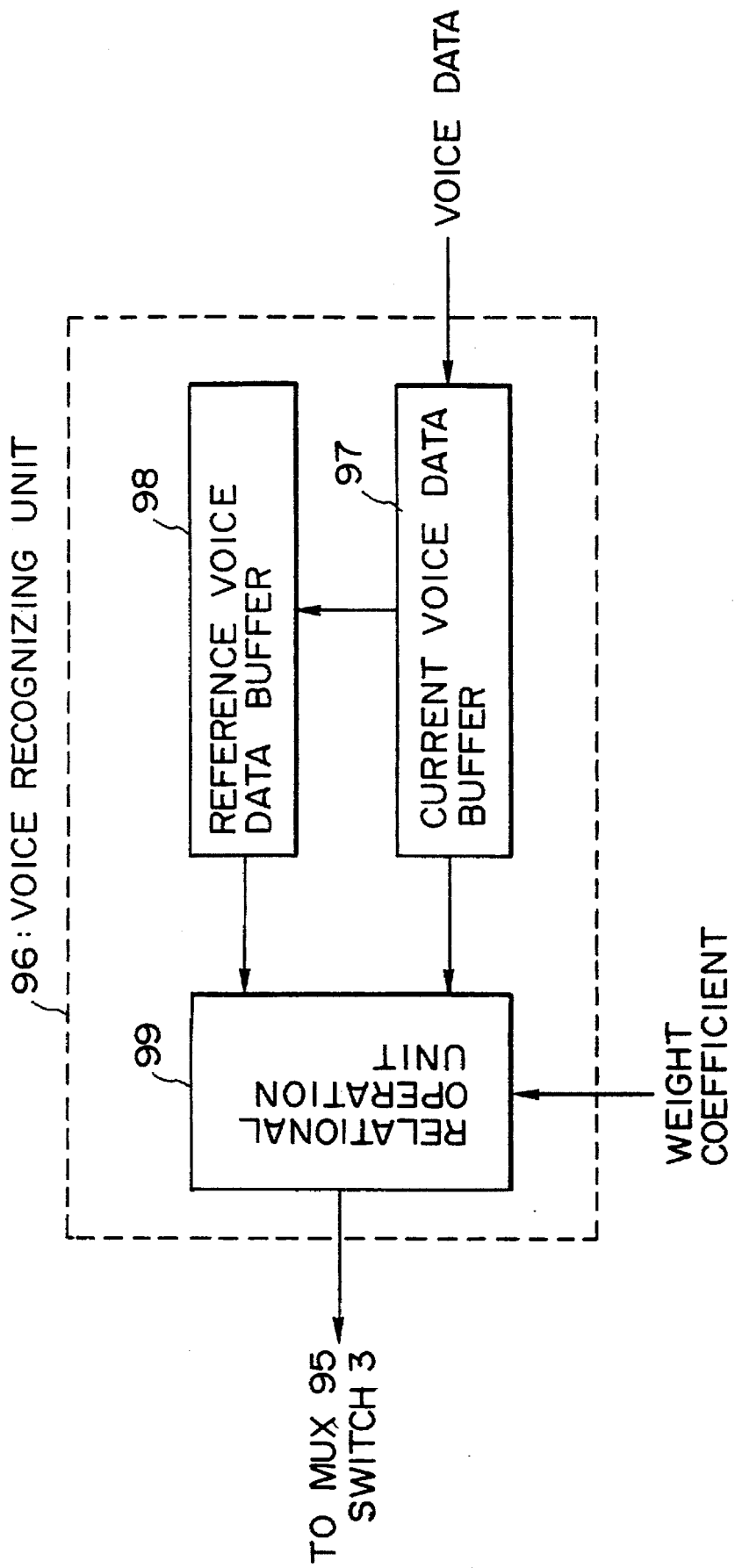
FIG. 18 is a block diagram showing the configuration of the voice recognizing unit.

When an operator is positioned near the mike 39, he or she can switch the setting of the switching unit 95, etc. to vocally transmits a warning message, etc. directly to the speaker 31 at the monitored area side Described below is the seventh embodiment associated with the sixth principle of the present invention. FIG. 17 is the block diagram showing the configuration of the seventh embodiment. FIG. 18 is the block diagram showing the configuration of the voice recognizing unit 96 shown in FIG. 17. As shown in FIG. 17, the embodiment further comprises a voice recognizing unit 96 in the sound compressing/ reconstructing unit 48 used in the configuration of the sixth embodiment so that voice data input through the mike 39 can be detected and the setting of the switching unit 95 can be automatically switched. Since the other portions and effects of the configuration is the same as those shown in FIG. 16, the corresponding portions are identified by the same numbers and the detailed explanation is omitted here.

The voice recognizing unit 96 is configured as shown in FIG. 18. The voice data are input from the mike 39 through the A/D converter 71, input to a current voice data buffer 97. Then, the input voice data are transferred to a reference voice data buffer 98, and relational operation unit 99. The voice data input to the reference voice data buffer 98 are sent to the relational operation unit 99. The relational operation unit 99 receives currently input voice data as current voice data, and previously input voice data as reference voice data.

The reference voice data may be generated as a weighted mean of a plurality of current voice data in time series. The relational operation unit 99 receives these two types of data and performs a relational operation to obtain a relational value. That is, if no data are input from the mike 39 for some time, then both data become almost identical and relational values becomes high. If voice input is started, both data become different from each other and relational values becomes low. A weight coefficient is input to the relational operation unit 99 for adjustment.

The relational operation unit 99 monitors an obtained relational value, and switches the setting of the switching unit 95 such that the input through the mike 39 is validated if the relational value is smaller than a predetermined value and the voice data from the computer 50 is validated if the relational value is larger than the predetermined value. Thus, an operator only has to input his or her voice through the mike 39 to allow a voice input to be accepted, thereby regenerating in real time a warning message, etc. through the speaker 31 at the monitored area side.

If no data are input through the mike 39, then the switching unit 95 automatically returns to the original state. According to the present embodiment, the setting of the switching unit 95 is switched by an output from the voice recognizing unit 96. However, another switching unit, for example, the switching unit 94 also can be controlled by an output from the voice recognizing unit 96.

According to the sixth principle of the present invention, monitoring a change in the voice input through a mike detects the start of a voice input of an operator and starts fetching input voice data. Thus, the operator does not require an operation of devices prior to a voice input through the mike, thereby considerably improving the operability.

With regard to the third through sixth principles of the present invention, explained are the embodiments based on the second embodiment. It also can be based on the configuration according to the first embodiment.

Figure 19:
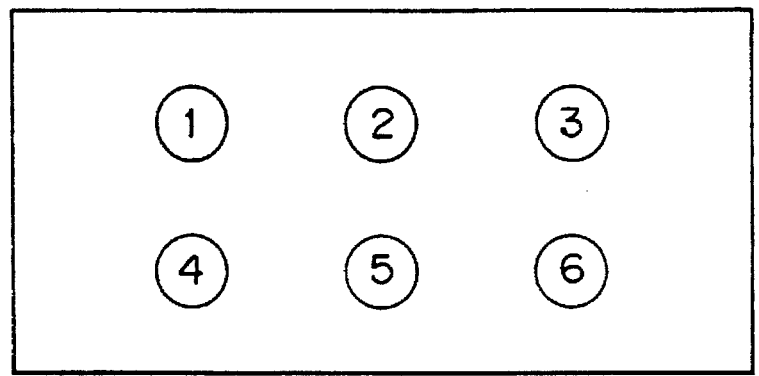
FIG. 19 shows an image displayed by the eighth embodiment according to the seventh principle.
Figure 20:
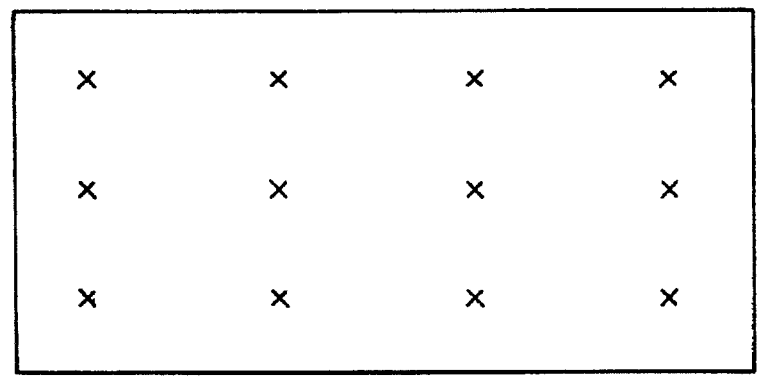
FIG. 20 corresponds to the image shown in FIG. 19;.

Explained below is the eighth embodiment associated with the seventh principle of the present invention. In this embodiment, a chlorine cylinder storage warehouse is monitored using a camera installed inside the warehouse to obtain the monitored image shown in FIG. 19. The circles having numbers inside indicate the positions of the cylinders. Furthermore, provided are a plurality of chlorine density sensors for detecting the leakage of chlorine inside the warehouse. FIG. 20 shows the positions (x) of chlorine density sensors in addition to the monitored image frames shown in FIG. 19. If chlorine leakage is detected by the sensors, then the operator realizes the danger and instructs the computer to display danger information.

Figure 21:
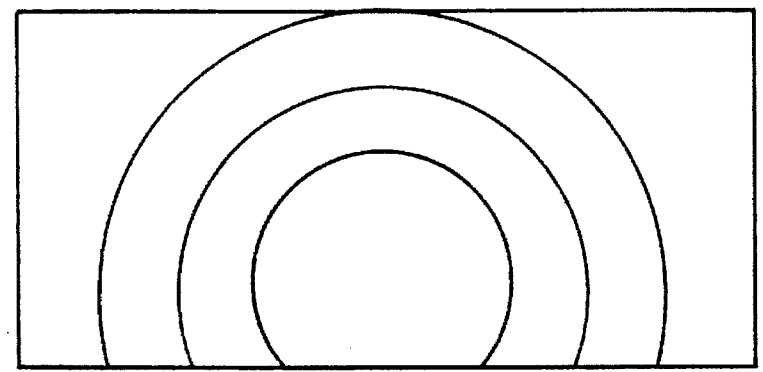
FIG. 21 shows a image indicating the contour generated by the eighth embodiment.
Figure 22:
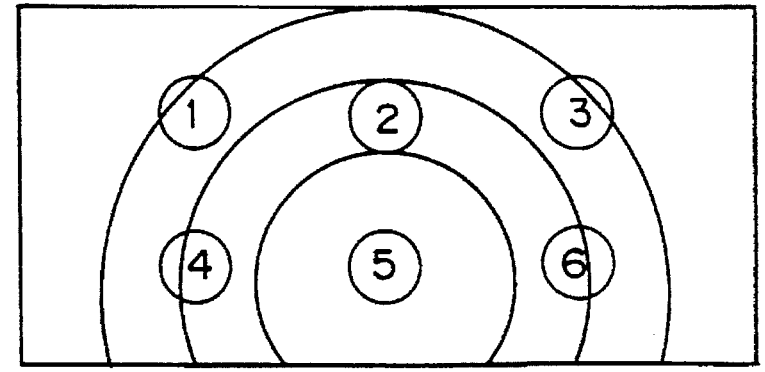
FIG. 22 shows an image displayed in the eighth embodiment.

Then, based on the chlorine density from the sensors, the computer generates pollution density distribution data in the warehouse, and obtains the density contour line from the density distribution. FIG. 21 shows the contour line indicating the density distribution. The monitored image shown in FIG. 19 overlaid with the image of the contour line generates the image shown in FIG. 22. Displaying the resultant image on the display allows an operator to grasp at one glance the occurrence of chlorine leakage, the pollution density, and the distribution, and easily take an appropriate action.

According to the present embodiment, the distribution of the chlorine density can be visually represented. Additionally, the distribution of oxygen density, the distribution of the intensity of magnetic field in an equipment where a high-pressure electric current is used can also be visualized according to the present embodiment.

According to the seventh principle of the present invention, displaying the monitor screen overlaid with the detection amount of the plurality of sensors installed for the monitor objects as a two-dimensional distribution graph allows a user to grasp the state of the monitor object in two dimensions, thereby improving the operability of the system.

What is claimed is:

1. In a process on a plurality of objects, a multimedia process monitor and control system for displaying image data and process data on a display unit, the image data being obtained by capturing an image of a monitored object, and the process data including input data and output data relating to the process for the monitored object, and regenerating sound data through a speaker, the sound data being collected from the monitored object, comprising:

a main storage device;

means for cyclically storing one or more of said image data, said process data and said sound data in said main storage device in real time;

an auxiliary storage device;

means for saving one or more of said image data, said process data and said sound data in said auxiliary storage device from like data stored in said main storage device in a given time before and after an abnormal condition when the abnormal condition is detected;

means for reading said saved data in said auxiliary storage device, and synchronously regenerating said saved data through the display unit and/or the speaker;

storing means for storing reference dam at a plurality of levels from a normal state to an abnormal state for said image, sound, and/or process data;

means for calculating an abnormality level of said image, sound and/or process data based on weighted similarity with said reference data obtained by performing a relational operation on said image, sound and/or process data and said reference data;

means for comparing the abnormality level of said image, sound and/or process data with a predetermined threshold, determining whether said image, sound and/or process data are normal or abnormal, and outputting an abnormality detection signal when said image, sound and/or process data are determined to be abnormal;

storing means for preliminarily storing a voice pattern for notifying that an abnormal condition has occurred; and means for reading said voice pattern from said storing means when said abnormality detection signal is output, said voice pattern depending on the abnormality level of said image, sound and/or process data, and regenerating an original voice through said speaker.

2. The multimedia process monitor and control system according to claim 1 further comprising:

means for comparing said input process data with previously input process data stored in said main storage device and detecting a change in a state of said process data; and means for storing said process data in said main storage device when said change in the state of said process data is detected.

3. The multimedia process monitor and control system according to claim 1 further comprising:

storing means for storing a warning voice message; and means for reading said warning voice message from said storing means when said abnormality detection signal is output, said warning voice message depending on the abnormality level of said image, sound and/or process data, and regenerating an original voice through a speaker at said monitored object side.

4. The multimedia process monitor and control system according to claim 1 further comprising:

means for sequentially storing voice data input through an operator mike;

operating means for calculating a relational value between said voice data input and previously stored voice data input; and means for transmitting said voice data input to an internal voice data processing unit when said relational value is smaller than a predetermined value.

5. The multimedia process monitor and control system according to claim 1 further comprising:

a plurality of sensors provided for said monitored object, said sensors each measuring a detected amount;

means for generating a two-dimensional distribution graph of a detected amount corresponding to a monitored object screen displayed on the display unit, based on the positions and detected amounts of said plurality of sensors; and means for multiplexing and displaying a two-dimensional distribution graph on said monitored object screen of the display unit.

6. The multimedia process monitor and control system according to claim 2 further comprising:

storing means for storing reference data at a plurality of levels from a normal state to an abnormal state for said image, sound, and/or process data;

means for calculating an abnormality level of data based on weighted similarity with said reference data obtained by performing a relational operation on said image, sound, and/or process data and reference data; and means for comparing the abnormality level of said image, sound, and/or process data with a predetermined threshold, determining whether said image, sound, and/or process data are normal or abnormal, and outputting an abnormality detection signal when said image, sound, and/or process data are determined to be abnormal.

7. The multimedia process monitor and control system according to claim 6 further comprising:

storing means for preliminary storing a voice pattern for notifying that an abnormal condition has occurred; and means for reading said voice pattern from said storing means when said abnormality detection signal is output, said voice pattern depending on the abnormality level of said image, sound and/or process data, and regenerating an original voice through said speaker.

8. The multimedia process monitor and control system according to claim 6 further comprising:

storing means for storing a warning voice message; and means for reading said warning voice message from said storing means when said abnormality detection signal is output, said warning voice message depending on the abnormality level of said image, sound and/or process data, and regenerating an original voice through a speaker at said monitored object side.

9. The multimedia process monitor and control system according to claim 7 further comprising:

means for sequentially storing voice data input through an operator mike;

operating means for calculating a relational value between said voice data input and previously stored voice data input; and means for transmitting said voice data input to an internal voice data processing unit when said relational value is smaller than a predetermined value.

10. The multimedia process monitor and control system according to claim 2 further comprising:

a plurality of sensors provided for said monitored object, said sensors each measuring a detected amount;

means for generating a two-dimensional distribution graph of a detected amount corresponding to a monitored object screen displayed on the display unit, based on the positions and detected amounts of said plurality of sensors; and means for multiplexing and displaying a two-dimensional distribution graph on said monitored object screen of the display unit.

11. The multimedia process monitor and control system according to claim 3, wherein said warning voice message is input using a mike.

12. The multimedia process monitor and control device according to claim 8, wherein said warning voice message is input using a mike.

13. The multimedia process monitor and control system according to claim 1 further comprising:

means for sequentially storing voice data input through an operator mike;

operating means for calculating a relational value between said voice data input and previously stored voice data input; and means for transmitting said voice data input to an internal voice data processing-unit when said relational value is smaller than a predetermined value.

14. The multimedia process monitor and control system according to claim 3 further comprising:

means for sequentially storing voice data input through an operator mike;

operating means for calculating a relational value between said voice data input and previously stored voice data input; and means for transmitting said voice data input to an internal voice data processing unit when said relational value is smaller than a predetermined value.

15. The multimedia process monitor and control system according to claim 8 further comprising:

means for sequentially storing voice data input through an operator mike;

operating means for calculating a relational value between said voice data input and previously stored voice data input; and means for transmitting said voice data input to an internal voice data processing unit when said relational value is smaller than a predetermined value.

16. The multimedia process monitor and control system according to claim 1 further comprising:

a plurality of sensors provided for said monitored object, said sensors each measuring a detected amount;

means for generating a two-dimensional distribution graph of a detected amount corresponding to a monitored object screen displayed on the display unit, based on the positions and detected amounts of said plurality of sensors; and means for multiplexing and displaying a two-dimensional distribution graph on said monitored object screen of the display unit.

17. The multimedia process monitor and control system according to claim 6 further comprising:

a plurality of sensors provided for said monitored object, said sensors each measuring a detected amount;

means for generating a two-dimensional distribution graph of a detected amount corresponding to a monitored object screen displayed on the display unit, based on the positions and detected amounts of said plurality of sensors; and means for multiplexing and displaying a two-dimensional distribution graph on said monitored object screen of the display unit.

* * * * *

UNITED STATES PATENT AND TRADEMARK OFFICE
CERTIFICATE OF CORRECTION

PATENT NO. : 5,625,572
DATED : April 29, 1997
INVENTOR(S) : Yonekura et al.

It is certified that error appears in the above-indentified patent and that said Letters Patent is hereby corrected as shown below:

Column 3, line 46, delete "0f" and insert --of-- therefor.

Column 13, line 3, delete "transmits" and insert --transmit-- therefor.

Column 13, line 16, delete "is" and insert --are-- therefor.

Column 14, line 60, delete "dam" and insert --data-- therefor.

Signed and Sealed this

Seventeenth Day of March, 1998

Attest:

BRUCE LEHMAN

*Attesting Officer*      *Commissioner of Patents and Trademarks*